(12) United States Patent
Osaka et al.

(10) Patent No.: US 12,481,203 B2
(45) Date of Patent: Nov. 25, 2025

(54) OPTICAL ELEMENT DRIVE DEVICE INCLUDING A COIL PART IN AT LEAST A PORTION BEING EXTENDABLE AND CONTRACTIBLE IN ACCORDANCE WITH MOVEMENT OF A MOVABLE PART, CAMERA MODULE, AND CAMERA MOUNTING DEVICE

(71) Applicants: Tomohiko Osaka, Tokyo (JP); Shun Suzuki, Tokyo (JP)

(72) Inventors: Tomohiko Osaka, Tokyo (JP); Shun Suzuki, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 226 days.

(21) Appl. No.: 18/268,653

(22) PCT Filed: Nov. 22, 2021

(86) PCT No.: PCT/JP2021/042797
§ 371 (c)(1),
(2) Date: Jun. 21, 2023

(87) PCT Pub. No.: WO2022/137941
PCT Pub. Date: Jun. 30, 2022

(65) Prior Publication Data
US 2024/0045309 A1  Feb. 8, 2024

(30) Foreign Application Priority Data
Dec. 24, 2020  (JP) .................................. 2020-214984

(51) Int. Cl.
*G03B 5/00* (2021.01)

(52) U.S. Cl.
CPC ........ *G03B 5/00* (2013.01); *G03B 2205/0007* (2013.01); *G03B 2205/0053* (2013.01)

(58) Field of Classification Search
CPC .............. G03B 5/00; G03B 2205/0007; G03B 2205/0053; G03B 3/10; G03B 15/00;
(Continued)

(56) References Cited

U.S. PATENT DOCUMENTS

| 2017/0254979 A1 | 9/2017 | Bai | |
| 2018/0224088 A1* | 8/2018 | Park | ...................... F21V 7/0066 |

(Continued)

FOREIGN PATENT DOCUMENTS

| JP | 2012-118336 | 6/2012 |
| JP | 2015-031904 | 2/2015 |

(Continued)

OTHER PUBLICATIONS

International Search Report and the Written Opinion Dated Feb. 1, 2022 From the International Searching Authority Re. Application No. PCT/JP2021/042797 and Its Translation of Search Report Into English. (8 Pages).

*Primary Examiner* — Gevell V Selby

(57) ABSTRACT

This optical element drive device comprises: a movable part; a drive unit; a substrate part that can supply power to the movable part; and a power supply path unit that constitutes a power supply path between the substrate part and the movable part by extending so as to connect a substrate-part-side terminal and a movable-part side terminal that are set apart from each other in a second direction, the power supply path unit having in at least a portion a coil part that can extend and contract in accordance with the movement of the movable part.

12 Claims, 25 Drawing Sheets

(58) Field of Classification Search
CPC ........ G03B 17/02; G03B 17/17; G03B 30/00;
G03B 17/12; G03B 2205/0069; G02B
27/646; H04N 23/54; H04N 23/55
See application file for complete search history.

(56) References Cited

U.S. PATENT DOCUMENTS

| | | | |
|---|---|---|---|
| 2018/0239162 A1* | 8/2018 | Lee | H04N 23/57 |
| 2018/0364450 A1* | 12/2018 | Lee | H04N 23/55 |
| 2019/0260913 A1 | 8/2019 | Terasaki et al. | |
| 2021/0223567 A1 | 7/2021 | Li et al. | |
| 2021/0389551 A1* | 12/2021 | Jang | G03B 30/00 |

FOREIGN PATENT DOCUMENTS

| | | |
|---|---|---|
| JP | 2019-146061 | 8/2019 |
| WO | WO 2016/031756 | 3/2016 |
| WO | WO 2020/114183 | 6/2020 |

\* cited by examiner

OPTICAL ELEMENT DRIVE DEVICE INCLUDING A COIL PART IN AT LEAST A PORTION BEING EXTENDABLE AND CONTRACTIBLE IN ACCORDANCE WITH MOVEMENT OF A MOVABLE PART, CAMERA MODULE, AND CAMERA MOUNTING DEVICE

TECHNICAL FIELD

The present invention relates to an optical element driving apparatus, a camera module, and a camera-mounted apparatus.

BACKGROUND ART

In the related art, there is known a camera module mounted in a thin camera-mounted apparatus such as a smartphone. As the camera module as such, there is known a camera module with an optical element driving apparatus including an optical element that bends incident light, which is along a predetermined direction, in a direction toward an imaging element (for example, see Patent Literature (hereinafter referred to as "PTL") 1).

The camera module has a shake-correcting function (OIS (Optical Image Stabilization) function) of reducing irregularities of an image by optically correcting shake (vibration) generated during photographing by the above-described optical element driving apparatus rotationally driving the optical element in accordance with the direction of incident light.

For the optical element driving apparatus, there is generally known a configuration in which a movable part that holds an optical element is driven by, for example, configuring the movable part to be movable. A board part capable of supplying power to a driving source or the like for driving the movable part is provided on a side of a bottom surface of the movable part of the optical element driving apparatus.

Incidentally, there is a case where a certain kind of power supply to the inside of a movable part is performed. For example, in a case where an optical element is driven within a movable part, it is necessary to supply power to a driving part provided within the movable part. In this case, a power supply path part that forms a power supply path between a board part and the movable part is provided.

CITATION LIST

Patent Literature

PTL 1
Japanese Patent Application Laid-Open No. 2019-146061

SUMMARY OF INVENTION

Technical Problem

In this respect, however, since a movable part moves within a predetermined range of movement, the positional relationship between a connection portion of the movable part with a power supply path part and a board part may deviate due to movement of the movable part.

An object of the present invention is to provide an optical element driving apparatus, a camera module, and a camera-mounted apparatus each capable of absorbing a deviation of the positional relationship between a movable part and a board part due to movement of the movable part.

Solution to Problem

An optical element driving apparatus according to the present invention includes: a movable part capable of holding an optical element that bends incident light along a first direction such that the incident light travels toward one direction in a second direction; a driving part that drives the movable part; a board part capable of supplying power to the movable part; and a power supply path part that forms a power supply path between the board part and the movable part by extending so as to connect a terminal on a side of the board part and a terminal on a side of the movable part, which are disposed away from each other in the second direction, and includes a coil part in at least a portion, where the coil part is extendable and contractible in accordance with movement of the movable part.

A camera module according to the present invention includes: the optical element driving apparatus described above; an optical element part including the optical element held by the movable part; and an imaging part that images a subject image formed by the optical element part.

A camera-mounted apparatus according to the present invention is an information device or a transport device and includes: the camera module described above; and an imaging control part that processes image information obtained by the camera module.

Advantageous Effects of Invention

According to the present invention, it is possible to absorb a deviation of the positional relationship between a movable part and a board part due to movement of the movable part.

DESCRIPTION OF EMBODIMENTS

Figure 1A:
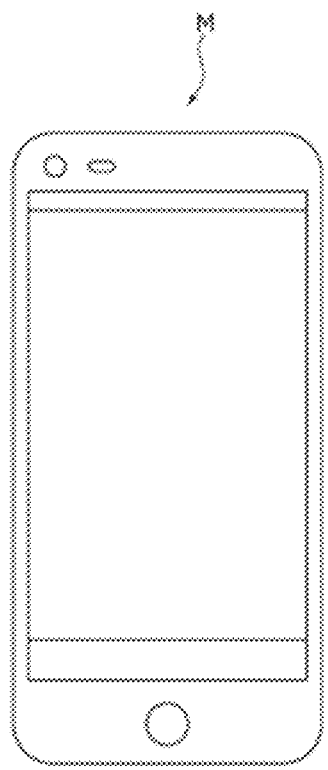
FIG. 1A illustrates a smartphone in which a camera module is mounted.
Figure 1B:
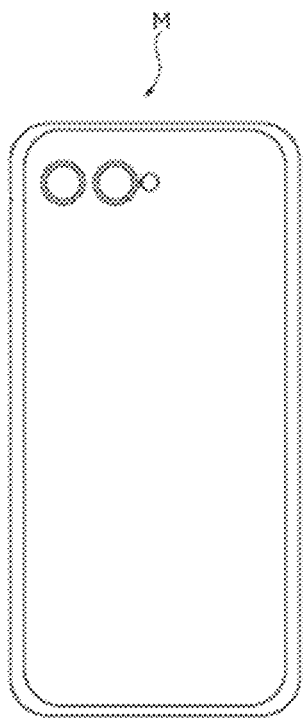
FIG. 1B illustrates the smartphone in which the camera module is mounted.
Figure 2:
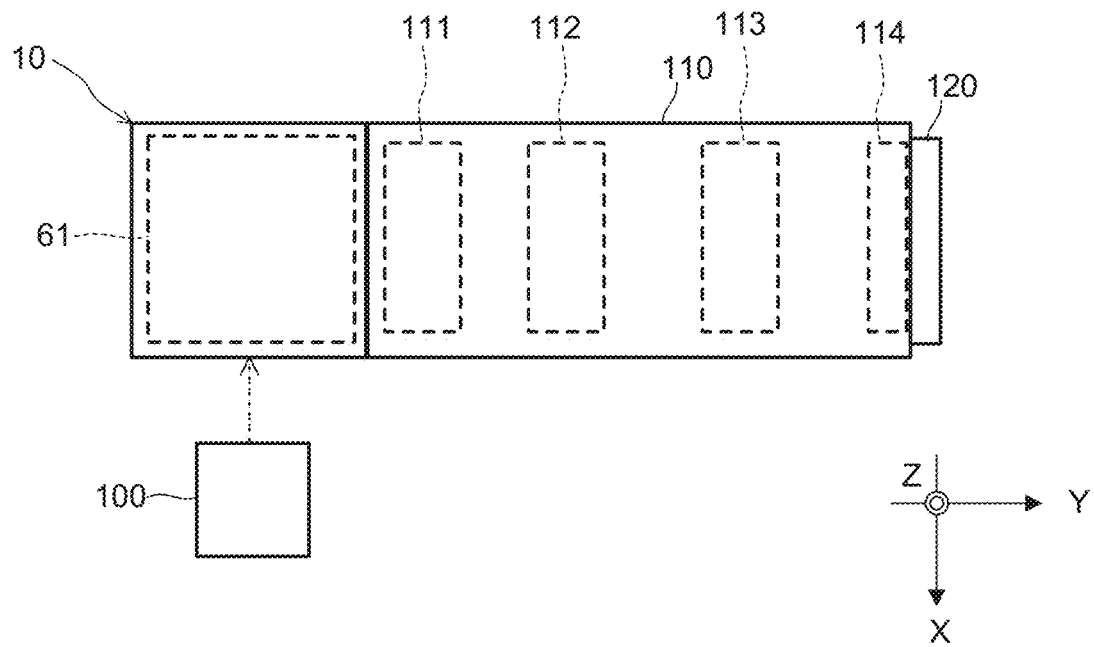
FIG. 2 simply illustrates a camera module according to an embodiment of the present invention.
Figure 3:
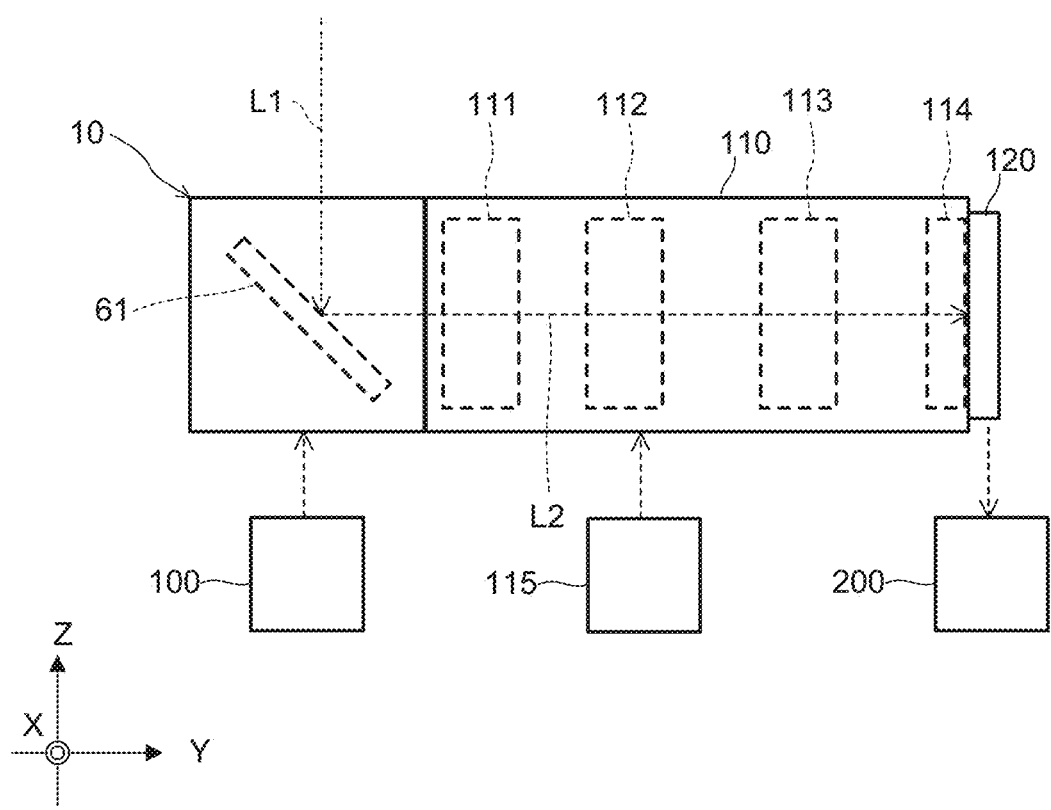
FIG. 3 simply illustrates a side-view configuration of the camera module according to the present embodiment.

Hereinafter, an embodiment according to the present invention will be described in detail with reference to the accompanying drawings. FIGS. 1A and 1B illustrate a smartphone in which a camera module is mounted. FIG. 2 simply illustrates camera module 1 according to an embodiment of the present invention. FIG. 3 simply illustrates a side-view configuration of camera module 1 according to the present embodiment.

Camera module 1 is mounted in, for example, a thin camera-mounted apparatus such as smartphone M (see FIGS. 1A and 1B), a mobile phone, a digital camera, a notebook computer, a tablet terminal, a handheld game console, and an in-vehicle camera.

In the description of the structure of camera module 1 of the present embodiment, an orthogonal coordinate system (X, Y, Z) is used. The drawings to be described later are also illustrated with a common orthogonal coordinate system (X, Y, Z). In a case where the camera-mounted apparatus is used to perform photographing in practice, camera module 1 is mounted such that the X direction is the left-right direction, the Y direction is the up-down direction, and the Z direction is the front-rear direction, for example. Light from a subject enters from the + side (plus side) in the Z direction, is bent, and is guided to the + side in the Y direction. A reduction in the thickness of the camera-mounted apparatus can be achieved by reducing the thickness of camera module 1 in the Z direction.

Figure 4:
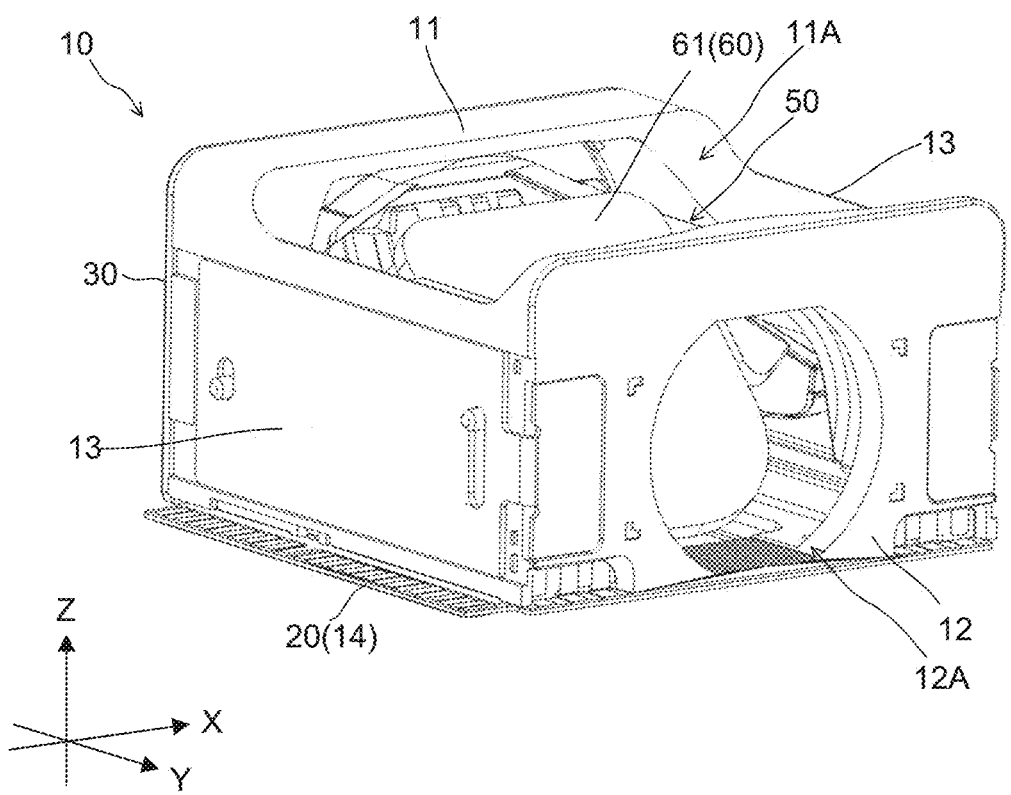
FIG. 4 is a perspective view of a portion of a casing of the camera module.

As illustrated in FIGS. 2 to 4 or the like, camera module 1 includes casing 10, board part 20, cover part 30, cap part 40 (see FIG. 8 or the like), mirror housing part 50, mirror holding part 60, power supply path part 70 (see FIG. 14 or the like), driving control part 100, lens driving part 110, and imaging part 120.

Driving control part 100 includes a central processing unit (CPU), a read only memory (ROM), a random access memory (RAM), and the like. The CPU reads a program corresponding to a processing content from the ROM, develops the program in the RAM, and cooperates with the developed program to centrally control a first driving part and a second driving part that are described later. Thus, driving control part 100 drives mirror housing part 50, which is housed by casing 10, and mirror holding part 60, which is held by mirror housing part 50.

In the present embodiment, mirror housing part 50 can be rotationally driven around the Y direction and mirror holding part 60 can be rotationally driven around the X direction. For this reason, mirror element part 61 that is held by mirror holding part 60 includes rotation axes that extend in the X direction and the Y direction, and rotates around the rotation axes under the control of driving control part 100. Thus, camera module 1 has a shake-correcting function (OIS (Optical Image Stabilization) function) of reducing irregularities of an image by optically correcting shake (vibration) generated during photographing.

As illustrated in FIG. 3, in camera module 1, incident light L1 along the Z direction (the first direction) enters casing 10. Incident light L1 is bent by mirror element part 61 within casing 10 so as to travel to the + side (one direction) in the Y direction (the second direction). Lens driving part 110 is provided on the + side of casing 10 in the Y direction, and reflected light L2 bent by mirror element part 61 enters lens driving part 110. Casing 10, board part 20, cover part 30, cap part 40, mirror housing part 50, mirror holding part 60, and power supply path part 70 correspond to the "optical element driving apparatus" of the present invention. Casing 10, board part 20, cover part 30, cap part 40, mirror housing part 50, mirror holding part 60, and power supply path part 70 will be described later.

Lens driving part 110 includes, for example, first fixed lens 111, first movable lens 112, second movable lens 113, second fixed lens 114, and lens driving control part 115. Within lens driving part 110, for example, first fixed lens 111, first movable lens 112, second movable lens 113, and second fixed lens 114 are disposed side by side in order from the − side (minus side) in the Y direction. Reflected light L2 is outputted to imaging part 120 via first fixed lens 111, first movable lens 112, second movable lens 113, and second fixed lens 114.

Lens driving control part 115 includes a CPU, a ROM, a RAM and the like, and controls movements of first movable lens 112 and second movable lens 113. In lens driving part 110, first movable lens 112 and second movable lens 113 independently move in the Y direction under the control of lens driving control part 115. Thus, camera module 1 performs stepless optical zoom and auto-focusing.

Imaging part 120 is disposed on the outer surface of lens driving part 110 on the + side in the Y direction and is configured such that reflected light L2 enters imaging part 120 via first fixed lens 111, first movable lens 112, second movable lens 113, and second fixed lens 114. Imaging part 120 includes an imaging element (not illustrated), an imaging board (not illustrated), and the like.

The imaging element is formed of, for example, a charge coupled device (CCD) image sensor, a complementary metal oxide semiconductor (CMOS) image sensor, or the like. The imaging element is implemented in the imaging board and is electrically connected to wiring on the board via a bonding wire. The imaging element captures a subject image formed by first fixed lens 111, first movable lens 112, second movable lens 113, and second fixed lens 114, and outputs an electrical signal corresponding to the subject image.

Further, a printed circuit board (not illustrated) is electrically connected to the imaging board of imaging part 120, and via the above printed circuit board, power is supplied to the imaging element and an electrical signal of a subject image captured by the imaging element is outputted. The above electrical signal is outputted to imaging control part 200 provided in the camera-mounted apparatus. Imaging control part 200 includes a CPU, a ROM, a RAM, and the like, and processes image information obtained by camera module 1.

Imaging control part 200 may be mounted in the camera-mounted apparatus, but may be incorporated in camera module 1.

Next, details of casing 10, board part 20, cover part 30, cap part 40 (see FIG. 8 or the like), mirror housing part 50, mirror holding part 60, and power supply path part 70 (see FIG. 14 or the like) will be described. Casing 10, board part 20, cover part 30, cap part 40, mirror housing part 50, mirror holding part 60, and power supply path part 70 correspond to the "optical element driving apparatus" of the present invention.

First, casing 10 will be described. As illustrated in FIG. 4, casing 10 houses cover part 30, cap part 40, mirror housing part 50, mirror holding part 60, and power supply path part 70, and has, for example, a cuboid shape as a whole. Casing 10 includes incidence wall 11, outgoing wall 12, a pair of side walls 13, and bottom wall 14.

Incidence wall 11 is the wall of casing 10 on the + side in the Z direction and is located on a side where incident light L1 enters. Incidence wall 11 is provided with opening 11A for incident light L1 to enter the interior of casing 10. Opening 11A is located at a position corresponding to mirror element part 61 that is housed within casing 10. The length of opening 11A in the Y direction is a length corresponding to the range of movement of the mirror in the Y direction (see FIGS. 28 and 29 or the like).

Thus, it is configured such that, for example, even when the positional relationship of incident light L1 with respect to opening 11A deviates due to vibration during photographing or the like, mirror element part 61 bends incident light L1, which has entered via opening 11A, within a range of opening 12A to be described later by appropriate movement of mirror element part 61 under the control of driving control part 100.

Outgoing wall 12 is the side wall of casing 10 on the + side in the Y direction and is located on a side on which reflected light L2, which is incident light L1 reflected by mirror element part 61, exits. Outgoing wall 12 is provided with opening 12A for reflected light L2 to be outputted outside casing 10.

Opening 12A is formed in a substantially circular shape extending in the X direction. In addition, arc-shaped guide groove part 12B (see FIG. 14), which is provided so as to extend around a rotation axis of mirror housing part 50 and is along opening 12A, is provided on the surface of outgoing wall 12 on the − side in the Y direction. Arc-shaped guide groove part 12B is configured to be in an arc shape protruding to the + side in the Z direction and has a groove shape that tapers toward the bottom thereof (on the + side in the Y direction). Outgoing wall 12 includes arc-shaped guide groove part 12B to thereby support mirror housing part 50 such that the rotation axis thereof is along the Y direction.

Figure 5:
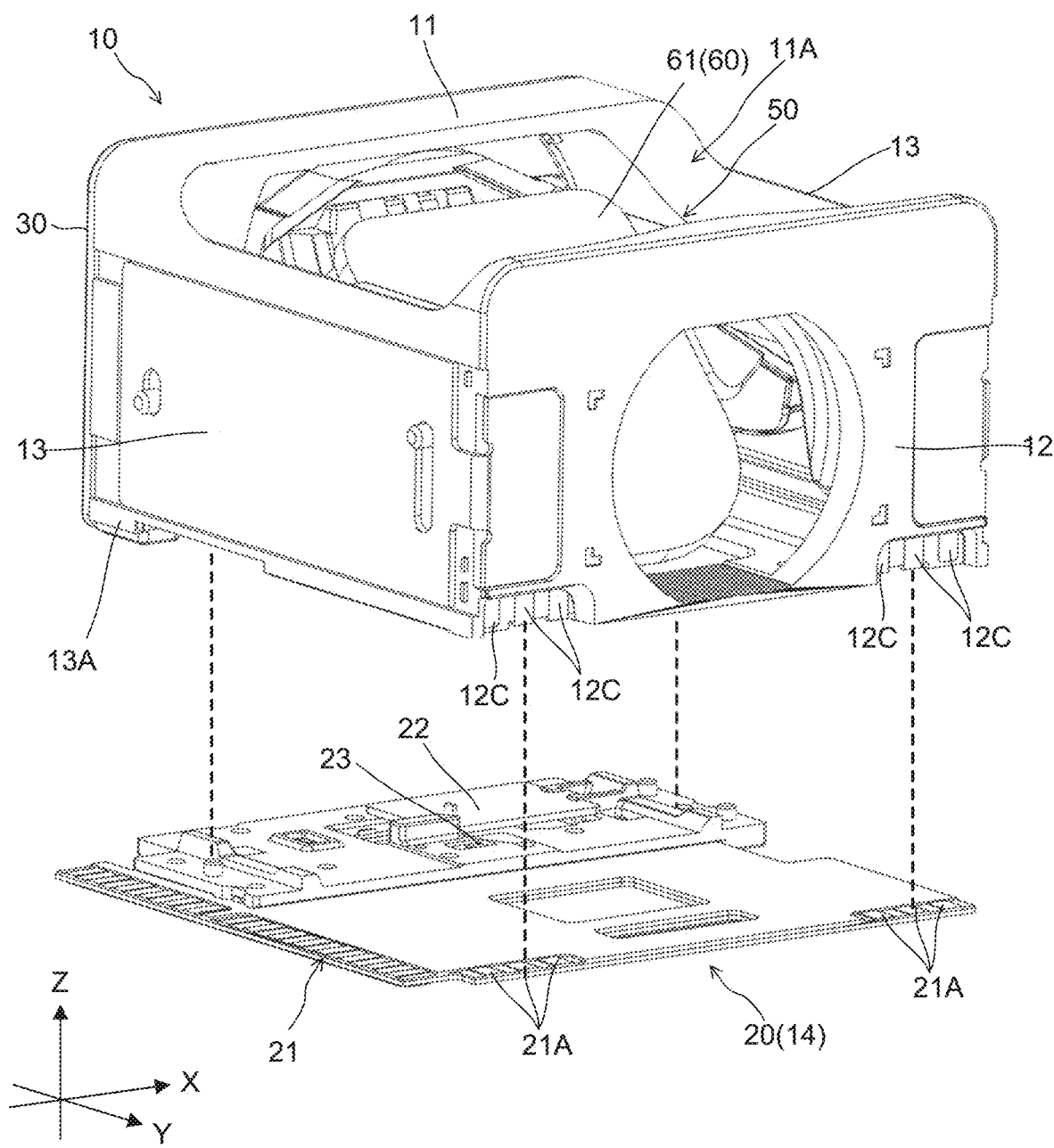
FIG. 5 is an exploded perspective view in which a bottom wall is removed from the casing.

The pair of side walls 13 is the side walls on the both sides of casing 10 in the X direction and is formed integrally with incidence wall 11 and outgoing wall 12. As illustrated in FIG. 5, each end surface of the pair of side walls 13 on the − side in the Z direction is provided with engaged part 13A with which cover part 30 engages.

Bottom wall 14 is a wall on the − side of casing 10 in the Z direction. That is, in the Z direction, bottom wall 14 is disposed on a side opposite to the incidence side of incident light L1 with respect to mirror housing part 50. Bottom wall 14 is provided to be attachable to and detachable from each end surface of the pair of side walls 13 on the − side in the Z direction. Bottom wall 14 is provided with board part 20 to which power is supplied from a power source in the camera-mounted apparatus.

Next, board part 20 will be described. Board part 20 is disposed away from mirror housing part 50 and along the Y direction, and includes a plurality of input/output terminals 21. Board part 20 is configured such that an electrical signal from outside casing 10 is inputtable thereto or an electrical signal from inside casing 10 is outputtable therefrom. Terminals 12C, which enable power supply between board part 20 and mirror housing part 50, are connected to, among the plurality of input/output terminals 21, input/output terminals 21A of board part 20 on the + side in the Y direction.

Terminals 12C are inserted into outgoing wall 12 and are provided at positions at which terminals 12C come into contact with input/output terminals 21A of board part 20 when board part 20 is attached to the pair of side walls 13. Terminals 12C are connected to mirror housing part 50 via power supply path parts 70 (see FIG. 31).

Thus, board part 20 can supply power to mirror housing part 50. Note that, three input/output terminals 21A of board part 20 are provided on a side of the positive electrode and three input/output terminals 21A of board part 20 are provided on a side of the negative electrode. For example, input/output terminals 21A on the side of the positive electrode are disposed, in the end part of board part 20 on the + side in the Y direction, on the − side in the X direction, whereas input/output terminals 21A on the side of the negative electrode are disposed, in the end part of board part 20 on the + side in the Y direction, on the + side in the X direction.

Figure 6:
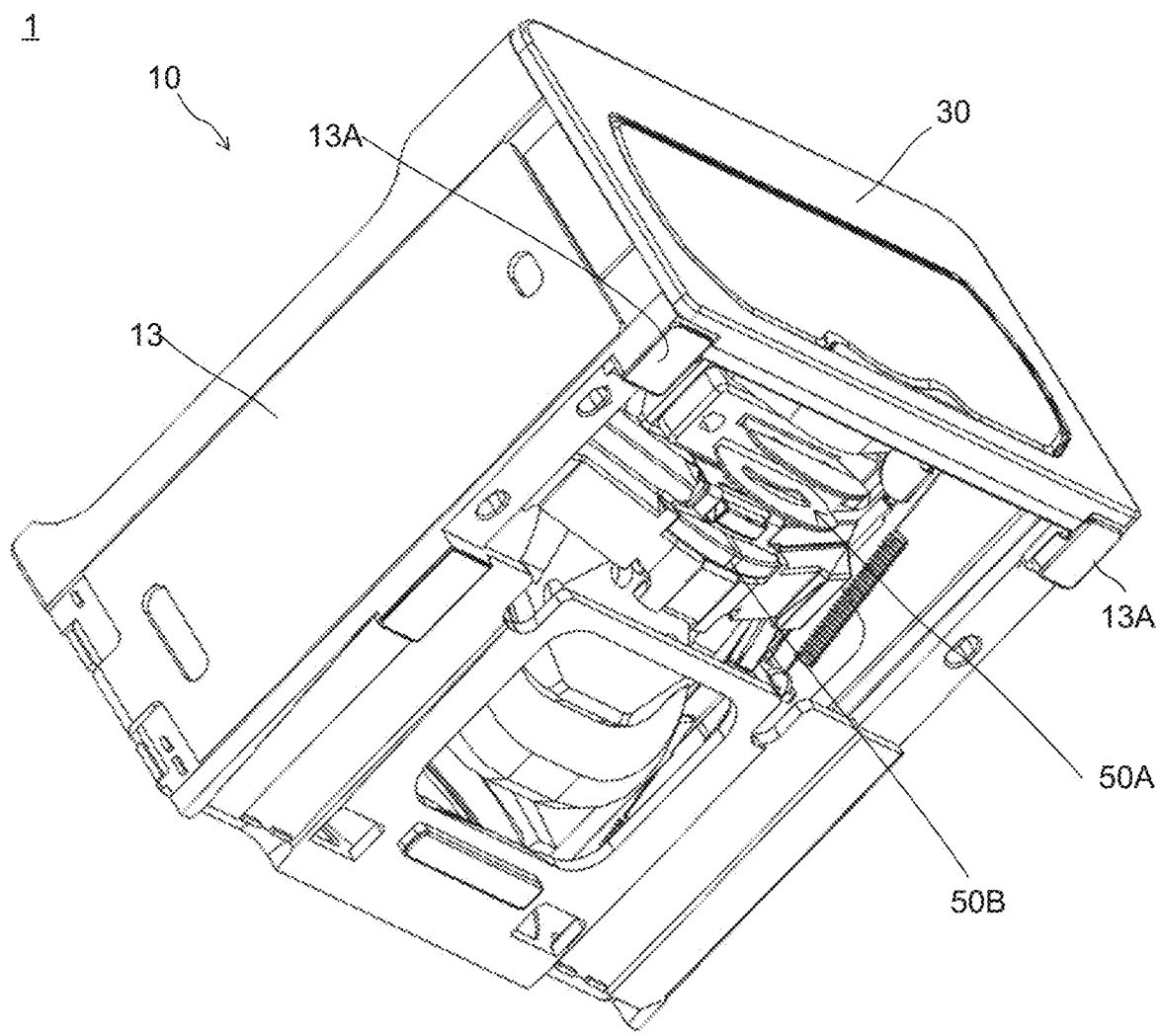
FIG. 6 is a perspective view of the casing viewed from a side of the bottom wall.
Figure 6:
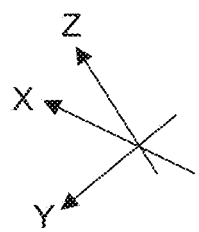

Further, board part 20 is provided with resonance part 22 that forms the first driving part for rotationally driving mirror housing part 50 around a rotation axis along the Y direction (first rotation axis). Further, as illustrated in FIG. 6, contact part 50A that comes into contact with resonance part 22 in vibration to thereby give pressurization for rotationally driving mirror housing part 50 to mirror housing part 50 is provided on the − side of mirror housing part 50 in the Z direction.

Resonance part 22 and contact part 50A form an ultrasonic motor that serves as the first driving part for the rotational driving of mirror housing part 50 around the Y direction. Note that, the first driving part may be other than an ultrasonic motor, such as a voice coil motor (VCM).

Further, magnet part 50B is provided on the − side of mirror housing part 50 in the Z direction. Magnet part 50B has a configuration in which an N-pole magnet and an S-pole magnet are adjacent to each other in the X direction.

As illustrated in FIG. 5, position detection part 23 is provided at a position of board part 20, where the position corresponds to magnet part 50B. Position detection part 23 is, for example, a magneto-resistive effect element or the like that can detect a magnetic force, and detects a magnetic force of magnet part 50B.

In a case where mirror housing part 50 is rotated around the rotation axis along the Y direction by the first driving part, the magnetic force of magnet part 50B, which is detected by position detection part 23, varies depending on the position of mirror housing part 50. That is, position detection part 23 detects the position of mirror housing part 50 according to the rotational driving thereof around the Y direction by detecting a change in the magnetic force of magnet part 50B in accordance with the position of mirror housing part 50.

Figure 7:
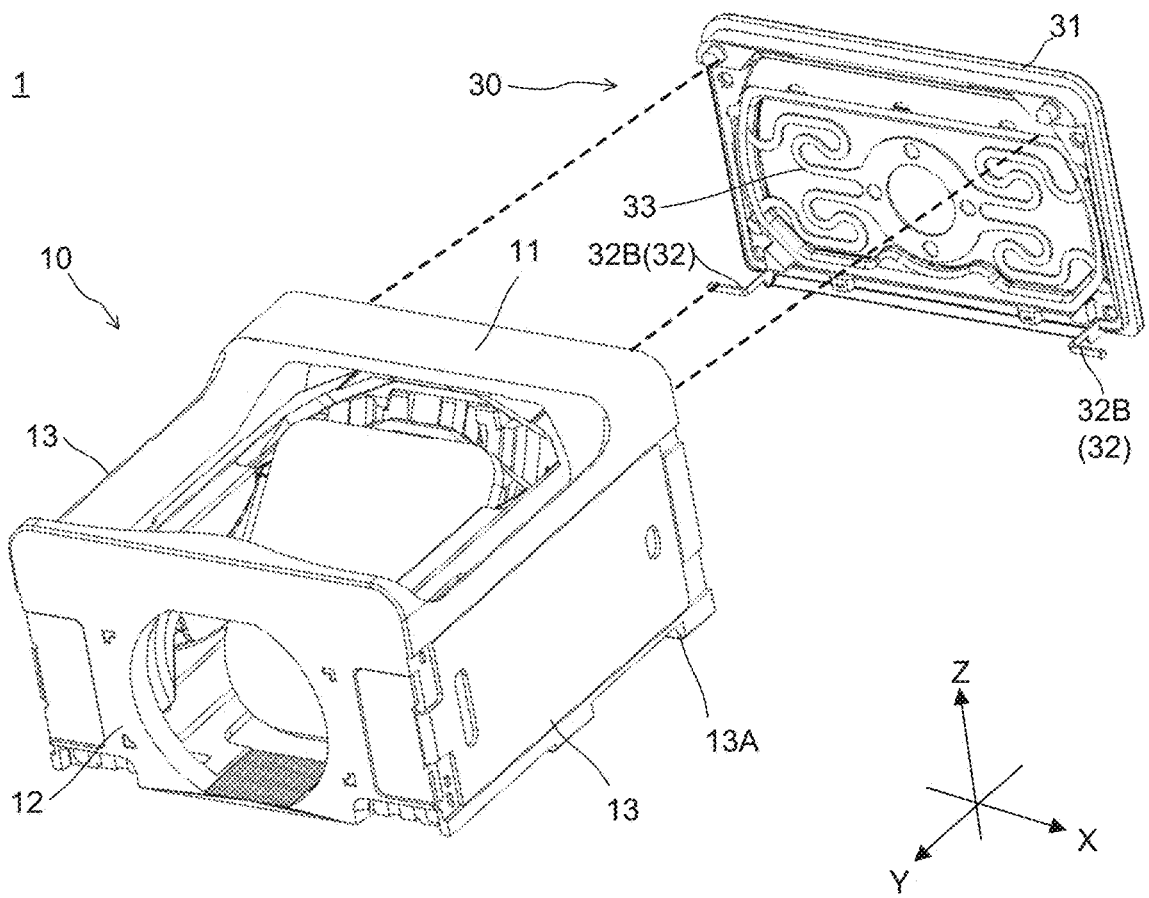
FIG. 7 is an exploded perspective view in which a cover part is removed from the casing.
Figure 8:
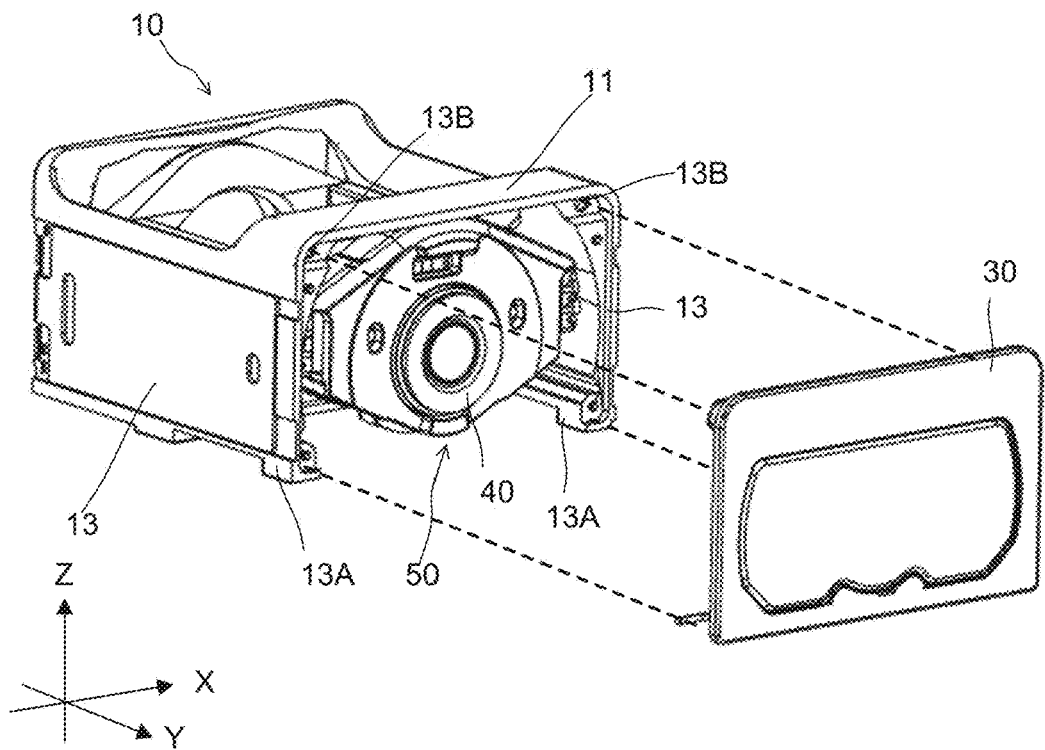
FIG. 8 is an exploded perspective view in which the cover part is removed from the casing.

Next, cover part 30 will be described. As illustrated in FIGS. 6, 7 and 8, cover part 30 is a wall on the − side of casing 10 in the Y direction and is configured to be attachable to and detachable from incidence wall 11 and each end part of the pair of side walls 13 on the − side in the Y direction. Cover part 30 includes main body wall part 31, resin part 32 and urging part 33.

Main body wall part 31 forms a wall surface part of cover part 30 and is configured to be in a rectangular shape capable of covering an opening portion formed by incidence wall 11 and the pair of side walls 13.

Figure 9:
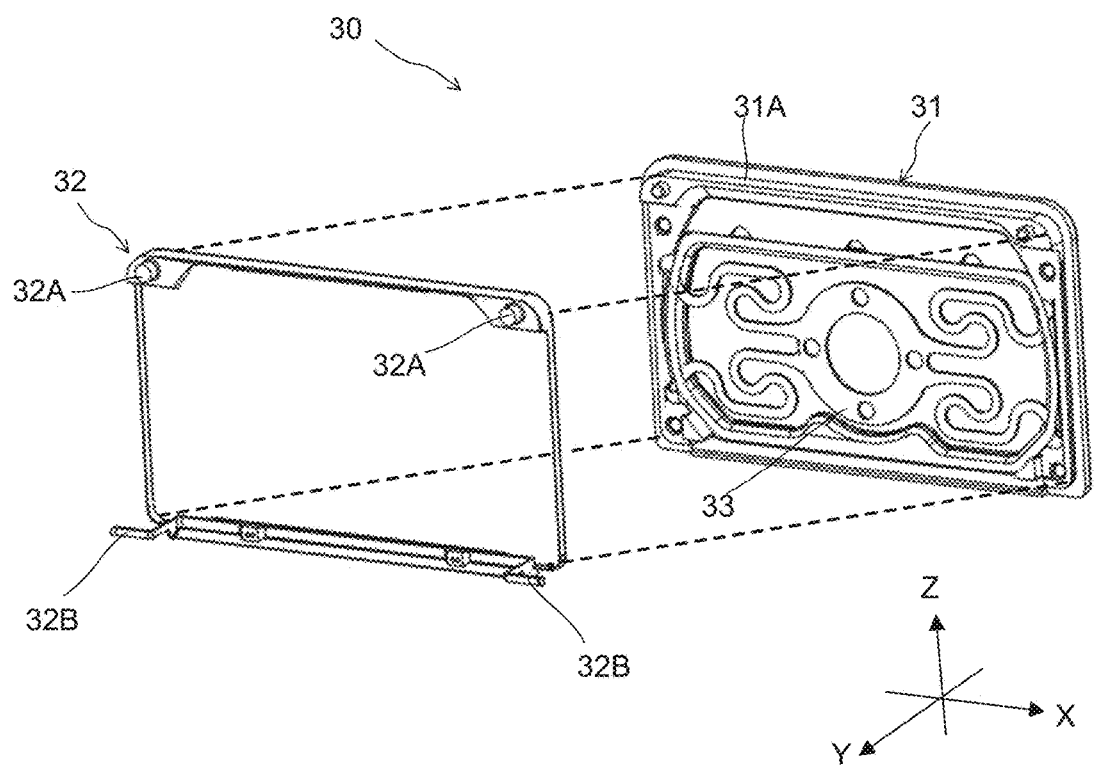
FIG. 9 is an exploded perspective view of the cover part.

As illustrated in FIG. 9, resin part 32 is configured to be in a rectangular frame shape and is fixed to main body wall part 31 by, for example, being fitted into protrusion part 31A having a rectangular shape and projected from the surface of main body wall part 31 on the + side in the Y direction. Resin part 32 includes projection parts 32A and engaging parts 32B.

In the side of resin part 32 on the + side in the Z direction, projection parts 32A are provided in the both end parts thereof in the X direction. Projection parts 32A are provided at positions corresponding to recessed parts 13B provided in side walls 13 described above and fit into recessed parts 13B.

In the side of resin part 32 on the − side in the Z direction, engaging parts 32B are provided in the both end parts thereof in the X direction. Engaging parts 32B are located at positions corresponding to engaged parts 13A provided on the end parts of side walls 13 described above on the − side in the Z direction and engage with engaged parts 13A.

As described above, projection parts 32A fit into recessed parts 13B and engaging parts 32B engage with engaged parts 13A, and thus, cover part 30 is attached to casing 10.

Figure 10:
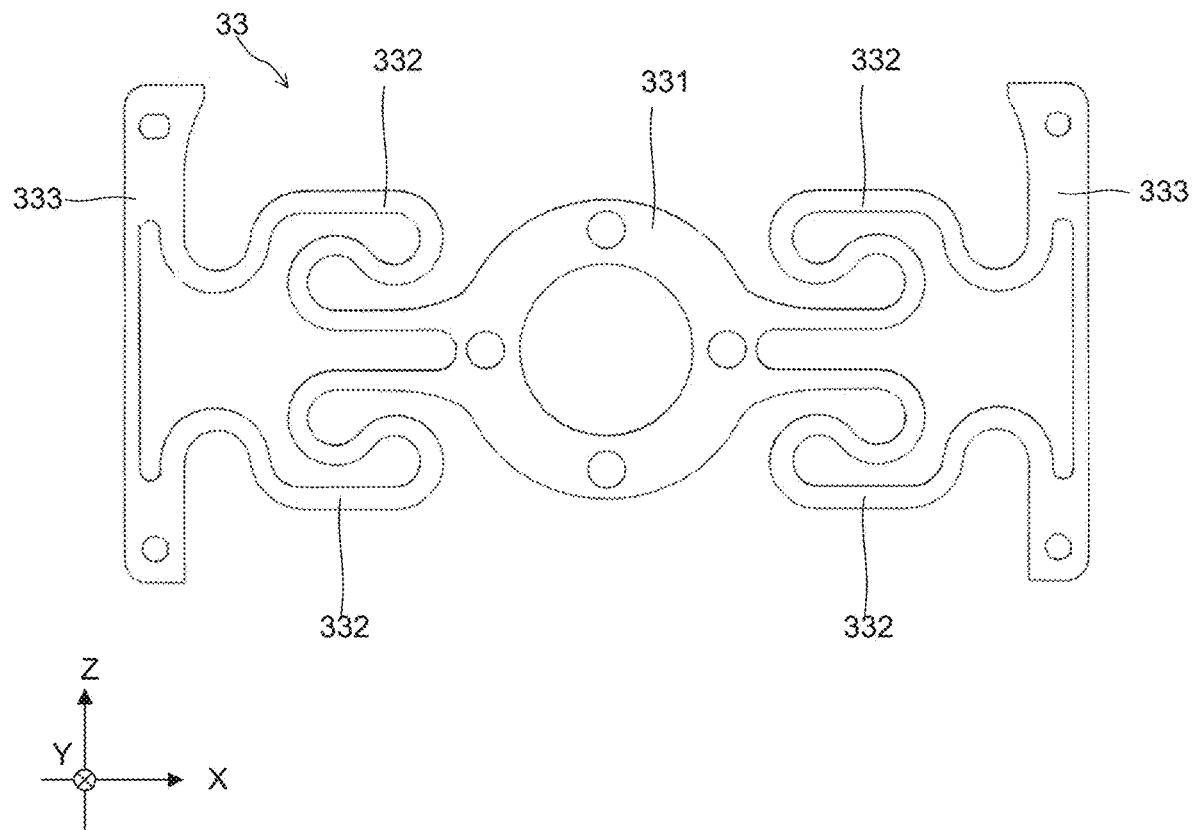
FIG. 10 illustrates an urging part.

Urging part 33 is, for example, an urging member such as a leaf spring and urges mirror housing part 50 to the + side in the Y direction by urging cap part 40 toward mirror housing part 50. Urging part 33 is, for example, fixed to main body wall part 31. As illustrated in FIG. 10, urging part 33 includes annular part 331, arm parts 332, and connection parts 333.

Annular part 331 is located in a center of urging part 33 in the X direction and is configured to be in an annular shape. Annular part 331 is a portion that comes into contact with cap part 40 and has an appearance substantially equivalent to that of cap part 40. Annular part 331 is located at a position corresponding to cap part 40 when cover part 30 is attached to casing 10.

Arm parts 332 are portions extending in the X direction from the both end parts of annular part 331 in the X direction, respectively, and two arm parts 332 are provided in each of the both end parts of annular part 331 in the X direction. Two arm parts 332 on one side (the + side or the − side) of annular part 331 in the X direction are connected by connection part 333 at the end parts of two arm parts 332 on the side opposite to the side of annular part 331 in the X direction. When, for example, a force that presses annular part 331 in the Y direction is applied on above arm parts 332, a restoring force (urging force) to return to the original shape is generated.

Further, arm parts 332 that hold annular part 331 therebetween in the X direction have a symmetrical shape with respect to annular part 331 in the X direction. Thus, urging forces from arm parts 332 on the both the sides in the X direction can be equalized in the X direction.

Further, two arm parts 332 on one side (the + side or the − side) of annular part 331 in the X direction have a symmetrical shape with respect to annular part 331 in the Z direction. Thus, urging forces from two arm parts 332 can be equalized in the Z direction.

Figure 11:
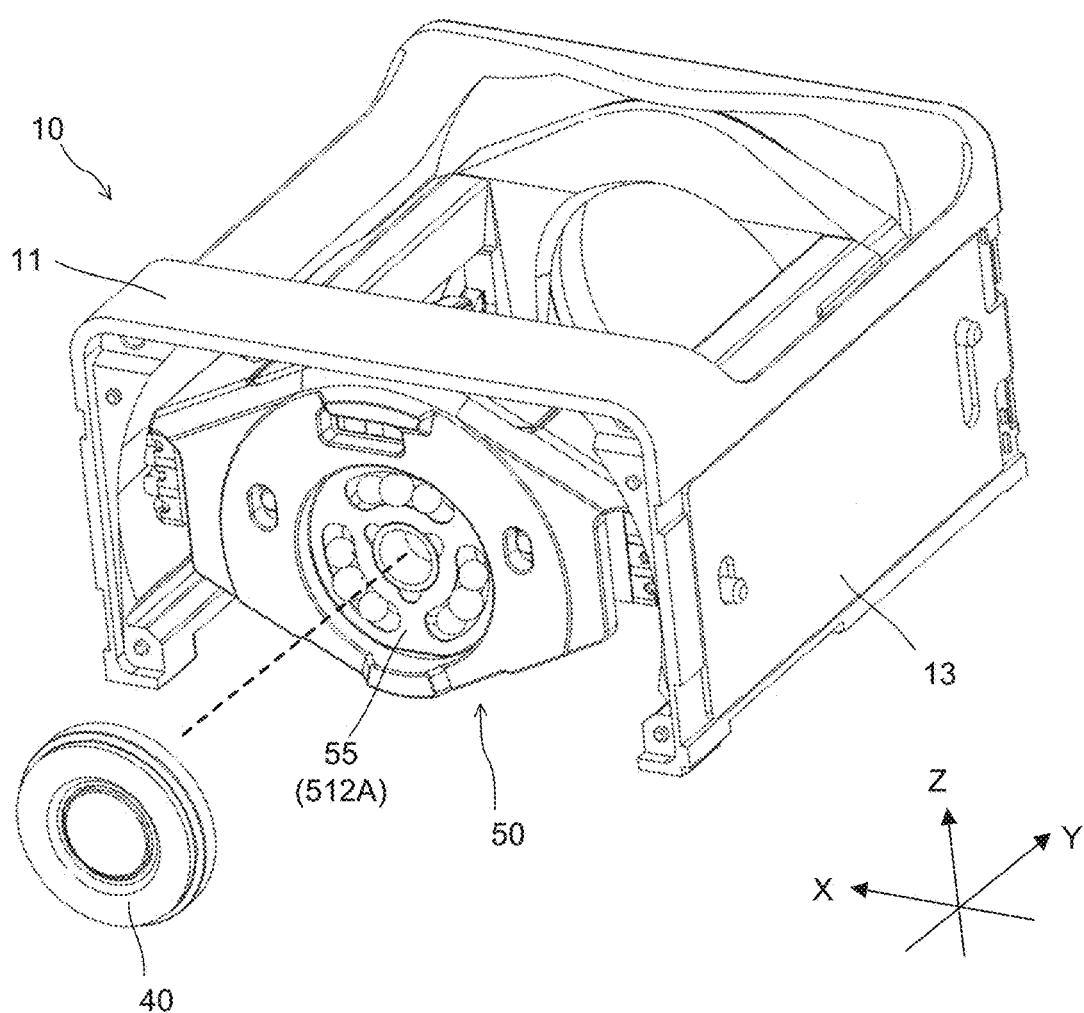
FIG. 11 is an exploded perspective view in which a cap part of the casing is removed.

Next, cap part 40 will be described. As illustrated in FIG. 11, cap part 40 is a portion that covers first sliding groove part 512A in the end part of mirror housing part 50 on the − side in the Y direction, and is disposed between mirror housing part 50 and cover part 30 (urging part 33). Cap part 40 is located at a position corresponding to annular part 331 of urging part 33 and is configured to be in a circular shape that is the same as the appearance of annular part 331 of urging part 33.

Figure 12:
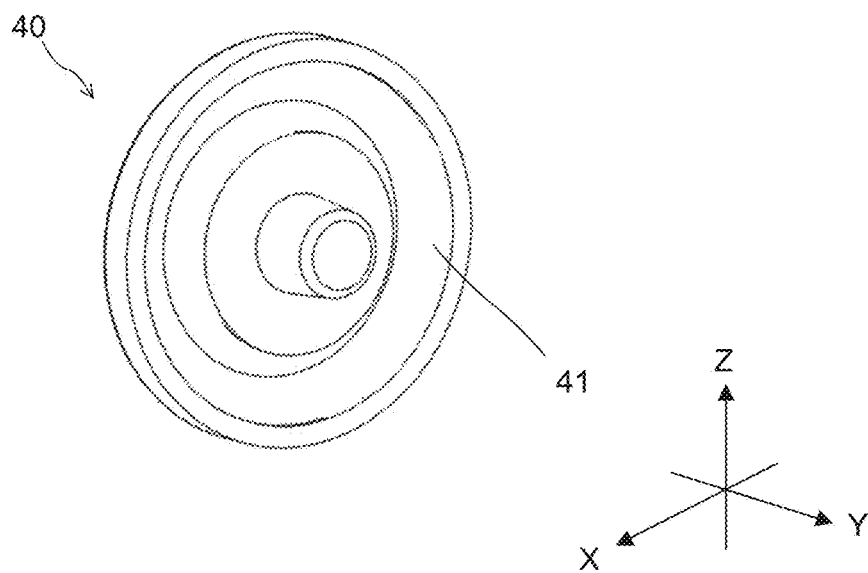
FIG. 12 is a perspective view of the cap part.

As illustrated in FIG. 12, annular guide groove part 41 that is provided so as to extend around the rotation axis of mirror housing part 50 is formed on the + side of cap part 40 in the Y direction, that is, on its side opposite to mirror housing part 50. Annular guide groove part 41 has a groove shape which tapers toward the bottom thereof (on the − side in the Y direction). Cap part 40 includes annular guide groove part 41 to thereby support mirror housing part 50 such that the rotation axis of mirror housing part 50 is along the Y direction.

Figure 13:
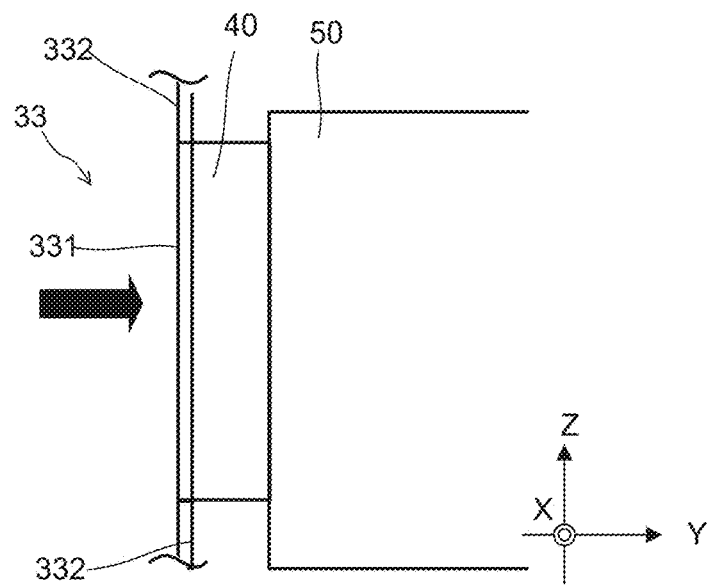
FIG. 13 illustrates how the urging part urges the cap part.

As illustrated in FIG. 13, cap part 40 is disposed between mirror housing part 50 and cover part 30, and thus, cap part 40 presses annular part 331 of urging part 33 to the − side in the Y direction. Thus, an urging force (see the arrow) for urging part 33 to return to its original shape is generated by arm parts 332, and urging part 33 urges cap part 40 toward mirror housing part 50. Thus, urging part 33 urges mirror housing part 50 toward the + side in the Y direction.

Figure 14:
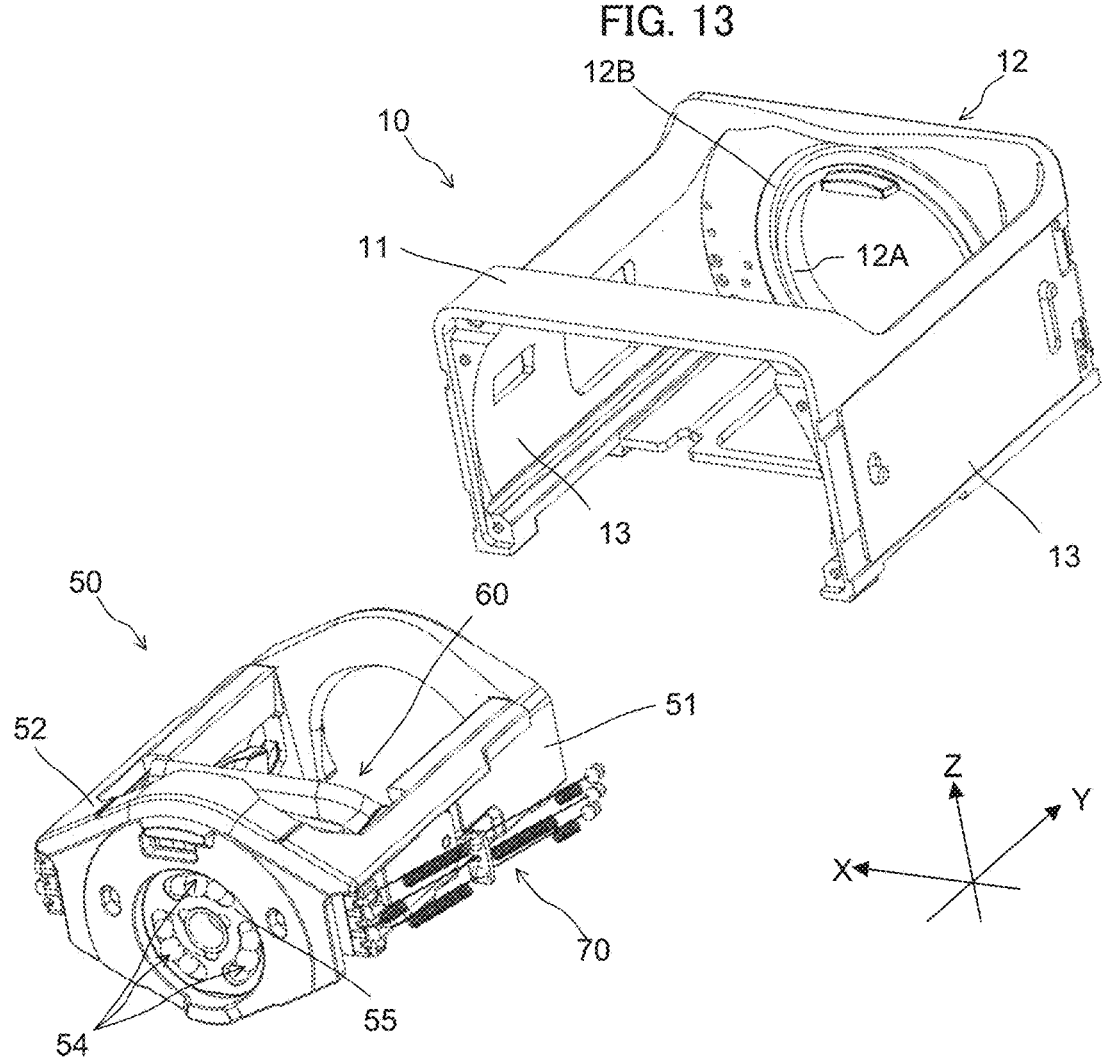
FIG. 14 is an exploded perspective view in which a mirror housing part is removed from the casing.

Next, mirror housing part 50 will be described. As illustrated in FIG. 14, mirror housing part 50 is a portion that houses mirror holding part 60 in camera module 1, and is rotated around the rotation axis along the Y direction by the first driving part described above. Mirror housing part 50 corresponds to the "movable part" of the present invention.

Mirror housing part 50 is configured to be in an arc shape such that at least the appearance thereof on the − side in the Z direction protrudes to the − side in the Z direction. Thus, the shape allows mirror housing part 50 to easily rotate around the rotation axis along the Y direction. Further, mirror housing part 50 is configured to be attachable to and detachable from casing 10 through the opening portion formed by incidence wall 11 and the pair of side walls 13 in casing 10 from which cover part 30 is detached.

Figure 15:
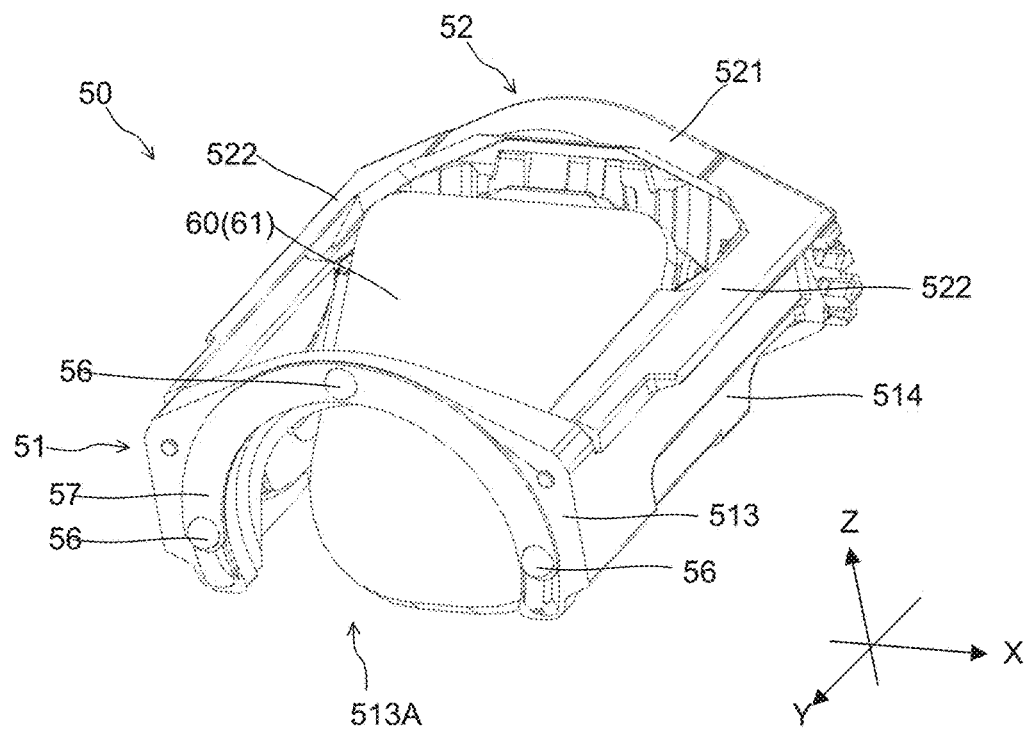
FIG. 15 is a perspective view of the mirror housing part.
Figure 16:
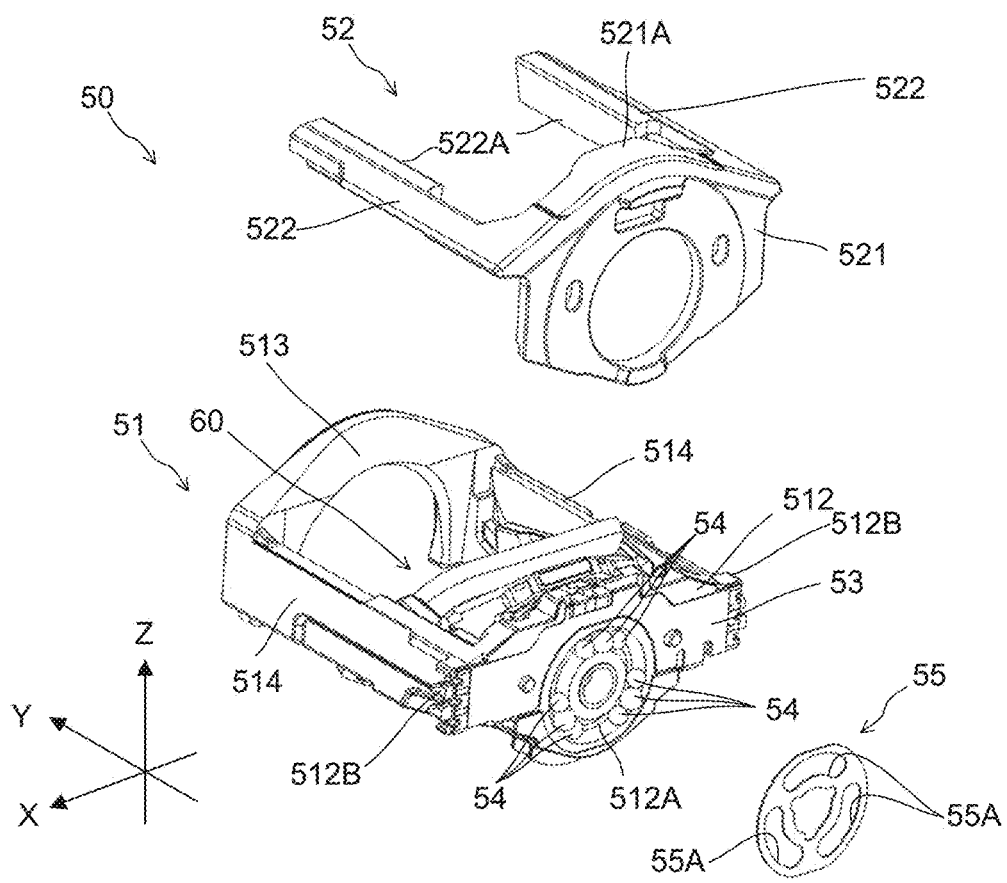
FIG. 16 is an exploded perspective view in which a regulation cover part and a first interval holding part are removed from the mirror housing part.

As illustrated in FIGS. 15 and 16, mirror housing part 50 includes housing casing 51, regulation cover part 52, housing-side board part 53, first sliding part 54, first interval holding part 55, second sliding part 56, and second interval holding part 57.

Figure 17:
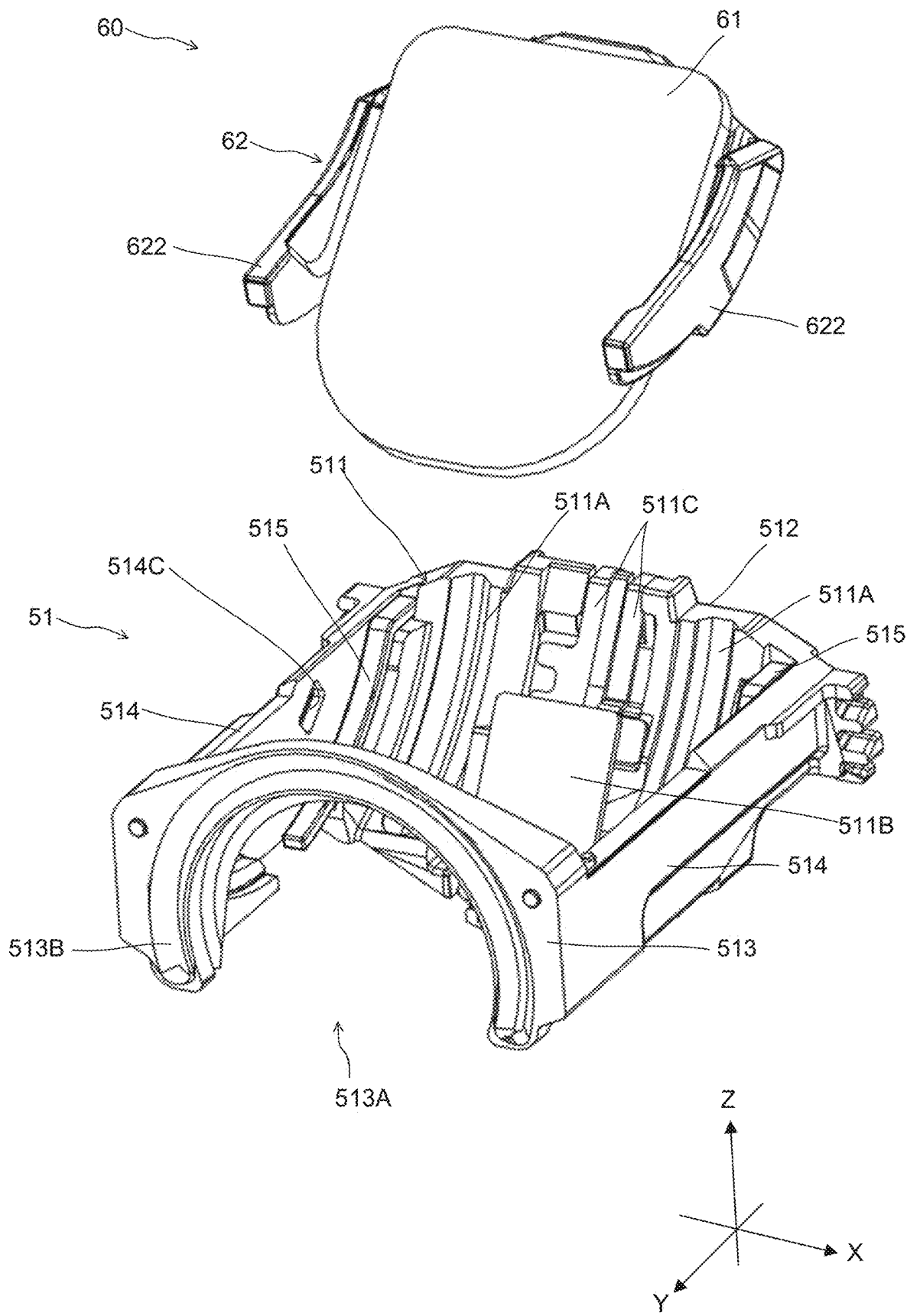
FIG. 17 is an exploded perspective view in which a mirror holding part is removed from the mirror housing part.

As illustrated in FIG. 17, housing casing 51 is a casing that houses mirror holding part 60, and includes mirror guide part 511, first sliding wall 512, second sliding wall 513, a pair of side walls 514, and a pair of yoke parts 515. Housing casing 51 has a rectangular appearance formed of first sliding wall 512 and second sliding wall 513, which extend in the X direction, and the pair of side walls 514, which extends in the Y direction.

Mirror guide part 511 is a portion that guides, while holding mirror holding part 60, rotation of mirror holding part 60 around the rotation axis along the X direction. In a portion surrounded by first sliding wall 512, second sliding wall 513, and the pair of side walls 514 in housing casing 51, mirror guide part 511 is provided on the − side (first sliding wall 512) of the portion in the Y direction.

Mirror guide part 511 is provided with rotation guide groove parts 511A for guiding the rotation of mirror holding part 60. Rotation guide groove part 511A forms a guide surface having an arc shape which protrudes in an oblique direction toward the − side in the Z direction and the − side in the Y direction (see FIG. 19), and one rotation guide groove part 511A is provided on each of sides of the both ends of mirror guide part 511 in the X direction.

Further, resonance part 511B as the second driving part is provided between two rotation guide groove parts 511A. Resonance part 511B is energized via terminal 511C that is electrically connected to housing-side board part 53. Further, contact part 50A and magnet part 50B as the first driving part described above are provided on the − side of mirror guide part 511 in the Z direction (see FIG. 6).

Figure 18:
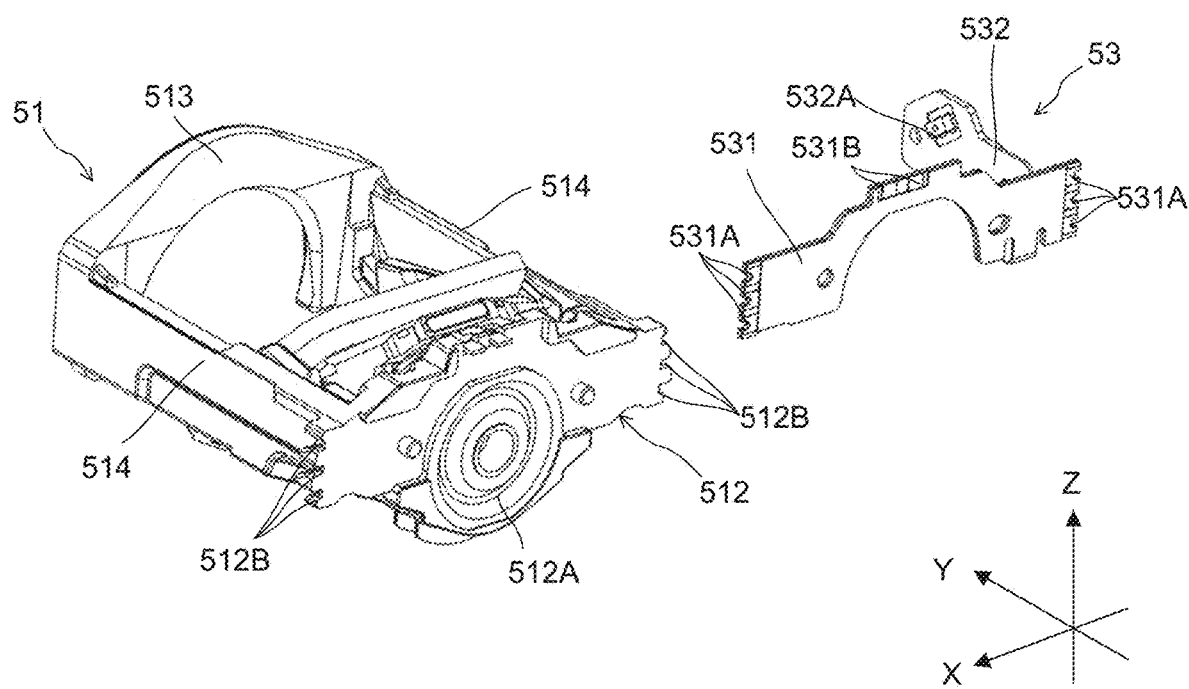
FIG. 18 is an exploded perspective view in which a housing-side board part is removed from a housing casing.

As illustrated in FIGS. 16 and 18, first sliding wall 512 is a side wall located on the − side of housing casing 51 in the Y direction, and is a wall that slides with cap part 40 described above via first sliding parts 54 and first interval holding part 55 when mirror housing part 50 rotates around the rotation axis along the Y direction. First sliding groove part 512A is provided in a center part of first sliding wall 512 in the X direction.

First sliding groove part 512A is configured to be in an annular shape in the same manner as annular guide groove part 41 of cap part 40 described above. First sliding groove part 512A is provided at a position at which first sliding groove part 512A faces annular guide groove part 41 in the Y direction. First sliding groove part 512A has a groove shape which tapers toward the bottom thereof (on the + side in the Y direction).

Further, first sliding wall 512 is provided with housing-side board part 53, and path holding parts 512B for holding power supply path parts 70 is provided in the both end parts of first sliding wall 512 in the X direction. Three path holding parts 512B are provided in each of the both end parts of first sliding wall 512 in the X direction, and are configured to be capable of holding three power supply path parts 70, respectively.

As illustrated in FIGS. 15 and 17, second sliding wall 513 is a side wall located on the + side of housing casing 51 in the Y direction, and is a wall that slides with outgoing wall 12 described above via second sliding parts 56 and second interval holding part 57 when mirror housing part 50 rotates around the rotation axis along the Y direction.

In second sliding wall 513, opening 513A through which reflected light L2 from the mirror element part exits is formed. Opening 513A is configured to be in an arc shape which protrudes to the + side in the Z direction in the same manner as the above-described shape of opening 12A of outgoing wall 12 (see FIG. 14). Further, second sliding groove part 513B along opening 513A is provided on the surface of second sliding wall 513 on the + side in the Y direction.

Second sliding groove part 513B is configured to be in an arc shape which protrudes to the + side in the Z direction in the same manner as arc-shaped guide groove part 12B of outgoing wall 12 described above (see FIG. 14). Second sliding groove part 513B is provided at a position at which second sliding groove part 513B faces arc-shaped guide groove part 12B in the Y direction. Second sliding groove part 513B has a groove shape which tapers toward the bottom thereof (on the − side in the Y direction).

Figure 19:
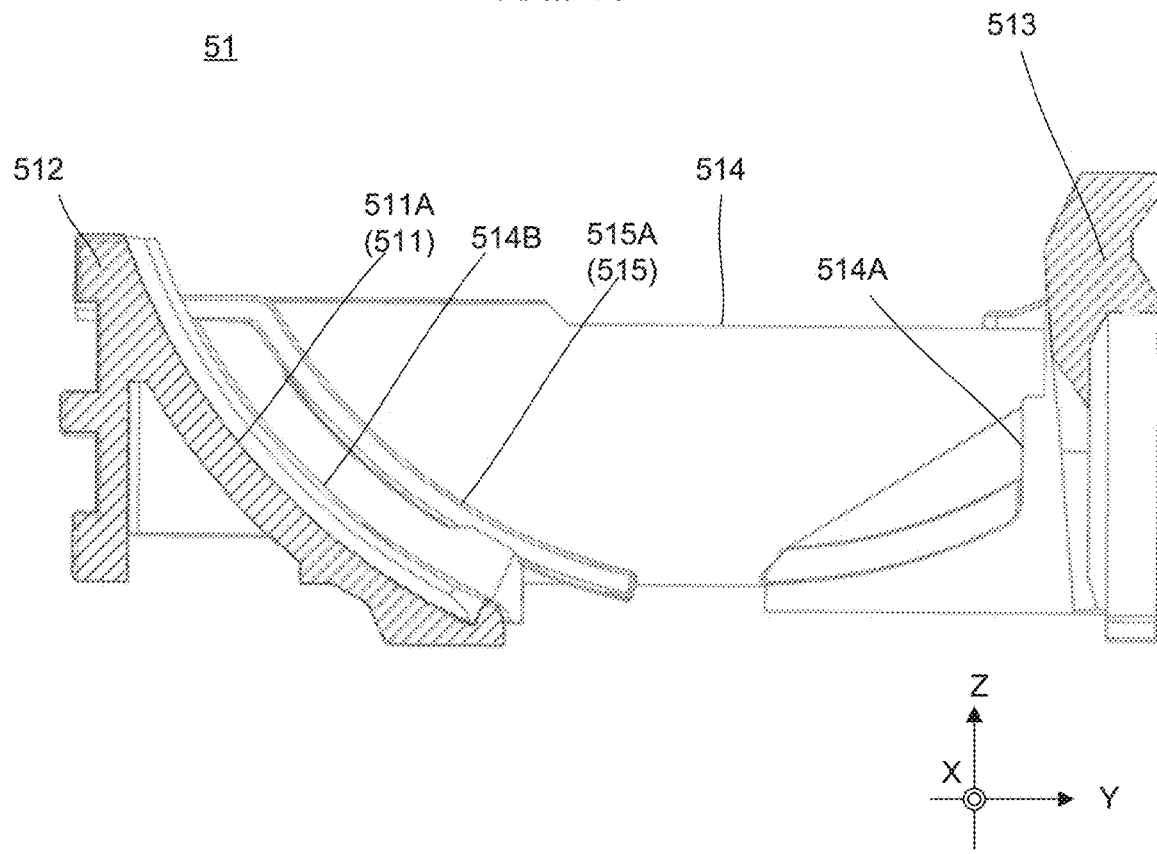
FIG. 19 is a cross-sectional side view of the housing casing.

As illustrated in FIG. 17, the pair of side walls 514 is provided so as to hold mirror guide part 511 therebetween in the X direction. Further, as illustrated in FIG. 19, regulation part 514A and yoke disposing part 514B are provided on the inner surface of the pair of side walls 514.

Note that, regulation parts 514A and yoke disposing parts 514B have substantially equivalent shapes in the pair of side walls 514, respectively. Accordingly, in the following description, only regulation part 514A and yoke disposing part 514B on the + side in the X direction will be described and a description of regulation part 514A and yoke disposing part 514B on the − side in the X direction will be omitted.

Regulation part 514A is a portion that regulates movement of mirror holding part 60 based on the rotational driving thereof. In the end part of each side wall 514 on the + side in the Y direction, regulation part 514A is provided to be projected from side wall 514 to the inner side thereof in the X direction.

Yoke disposing part 514B is a portion in which each of the pair of yoke parts 515 is disposed, and is provided to be projected from each side wall 514 to the inner side thereof in the X direction. Yoke disposing part 514B is configured to be in an arc shape which is along mirror guide part 511 described above and protrudes in an oblique direction toward the − side in the Z direction and the − side in the Y direction, and is provided at a position at which yoke disposing part 514B is projected to the + side of mirror guide part 511 in the Z direction.

The pair of yoke parts 515 is yokes that form a magnetic circuit together with magnet parts 623 to be described later, and is disposed in yoke disposing parts 514B of the pair of side walls 514, respectively. Yoke part 515 is configured to be in an arc shape which is along yoke disposing part 514B and protrudes in an oblique direction toward the − side in the Z direction and the − side in the Y direction. In other words, yoke part 515 includes first surface 515A that extends parallel to a guide surface (rotation guide groove part 511A that is the surface on the + side in the Z direction) of mirror holding part 60 in mirror guide part 511 in the X direction and is concentric with the guide surface in the Y direction.

As illustrated in FIGS. 15 and 16, regulation cover part 52 is provided in a range of the pair of side walls 514 and first sliding wall 512, and regulates detachment of mirror holding part 60 from mirror housing part 50. Regulation cover part 52 includes first regulation part 521 and second regulation parts 522.

First regulation part 521 is disposed so as to cover first sliding wall 512 from the − side in the Y direction. In first regulation part 521, a portion corresponding to first sliding groove part 512A opens. This portion has a size that allows cap part 40 to pass therethrough.

First regulation wall 521A is provided in the end part of first regulation part 521 on the + side in the Z direction. First regulation wall 521A is provided to be projected from the aforementioned end part to the + side in the Y direction. First regulation wall 521A described above regulates the movement of mirror holding part 60 to the + side in the Z direction (see FIG. 28).

Second regulation parts 522 extend from the both sides of first regulation part 521 in the X direction to the + side in the Y direction and are provided to be mountable in the pair of side walls 514. Second regulation part 522 is provided with second regulation wall 522A that extends to the − side in the Z direction inside side wall 514.

Figure 28:
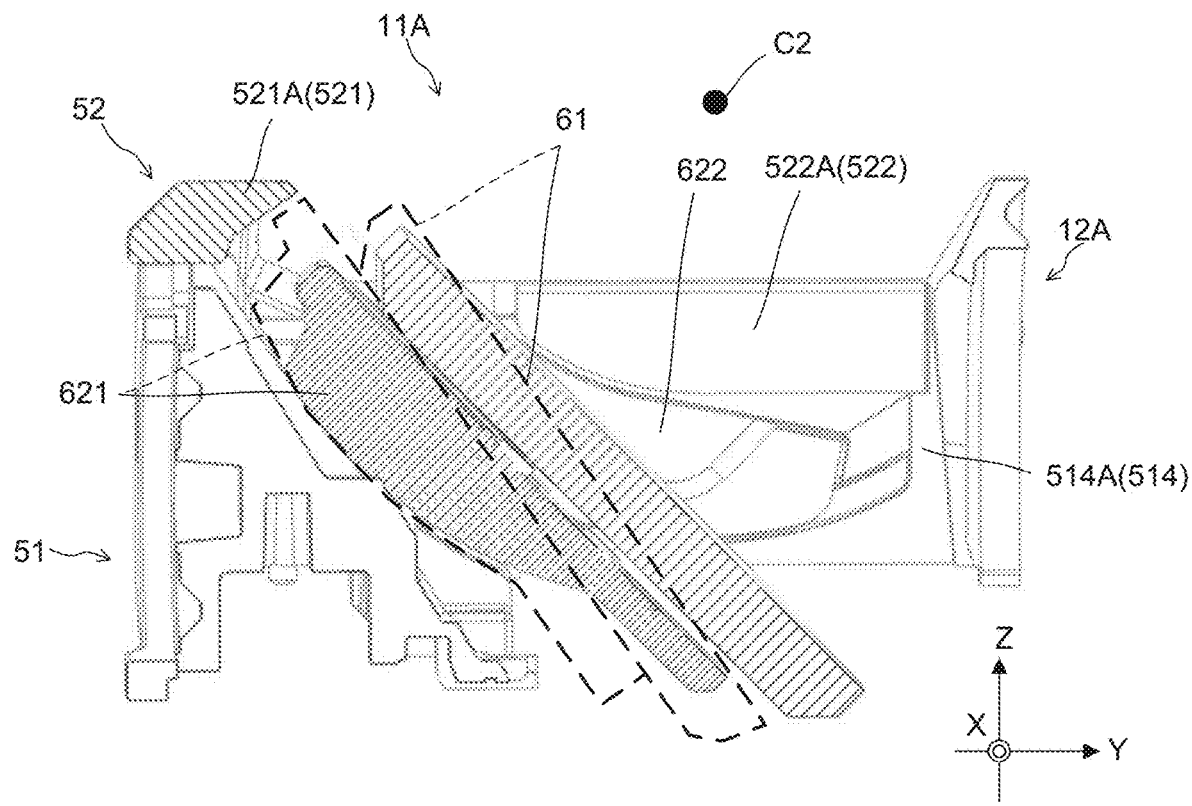
FIG. 28 illustrates a positional relationship between the mirror holding part and the regulation cover part.
Figure 29:
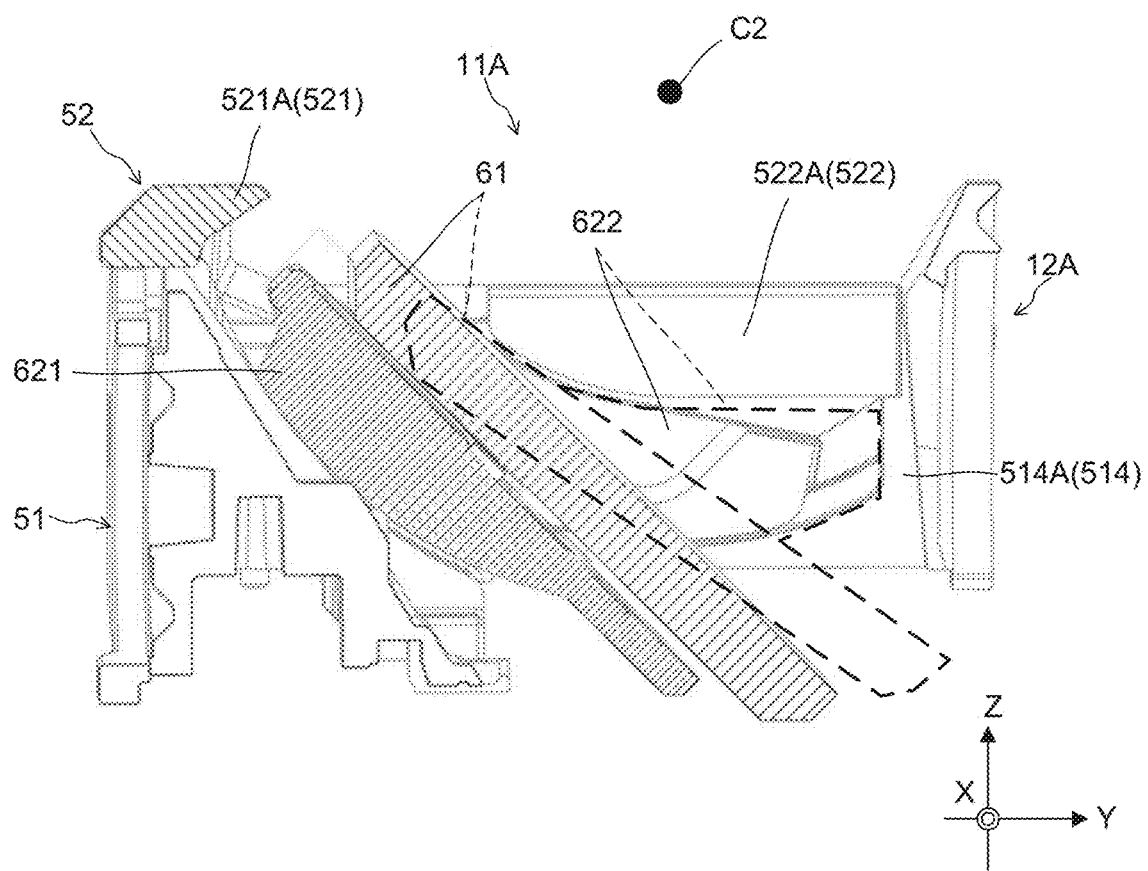
FIG. 29 illustrates a positional relationship between the mirror holding part and the regulation cover part.

Second regulation wall 522A described above regulates the movement of mirror holding part 60 to the + side in the Z direction (see FIGS. 28 and 29).

Further, in first sliding wall 512, a portion that is covered by regulation cover part 52 is provided with housing-side board part 53. As illustrated in FIG. 18, housing-side board part 53 is configured to be capable of engaging with a protrusion projected from first sliding wall 512 to the − side in the Y direction. Housing-side board part 53 includes main body board part 531 and extending board part 532.

Main body board part 531 is configured to extend from path holding parts 512B on the − side in the X direction to path holding parts 512B on the + side in the X direction. In main body board part 531, a portion corresponding to first sliding groove part 512A is notched to the + side in the Z direction so as not to overlap first sliding groove part 512A.

First power supply terminals 531A that are connected to power supply path parts 70 are provided in the both end parts of main body board part 531 in the X direction, that is, in the portions corresponding to path holding parts 512B. In the present embodiment, three first power supply terminals 531A are provided in each of the both end parts of main body board part 531 in the X direction.

Further, a center part of main body board part 531 in the X direction is provided with second power supply terminals 531B that are connected to terminals 511C (see FIG. 17) that are connected to resonance part 511B described above.

Extending board part 532 extends from the end part of main body board part 531 on the − side in the X direction to the + side in the Y direction along side wall 514. Position detection part 532A is disposed in extending board part 532.

Position detection part 532A is, for example, a magneto-resistive effect element or the like that can detect a magnetic force. Further, as illustrated in FIG. 17, position detection hole 514C penetrating in the X direction is formed in side wall 514 on the + side in the X direction. Position detection part 532A is disposed at a position corresponding to position detection hole 514C. Thus, position detection part 532A is disposed to be capable of facing mirror holding part 60 inside housing casing 51 and magnetically detects the position of mirror holding part 60 (magnet part 623).

Figure 20:
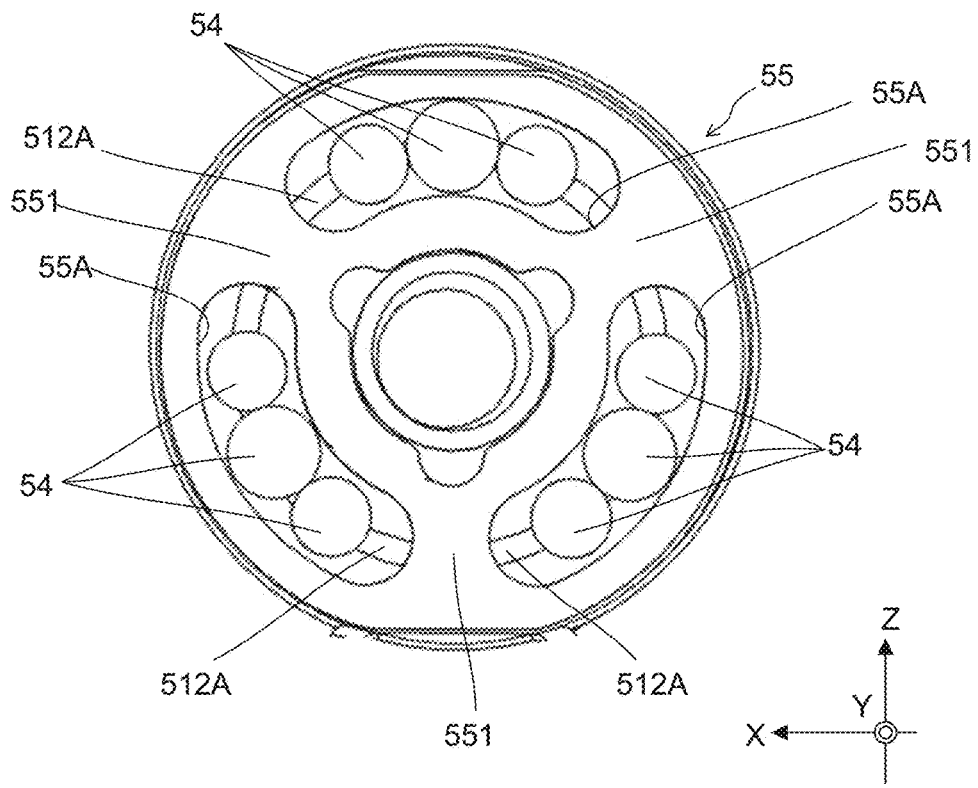
FIG. 20 illustrates the first interval holding part and first sliding parts.
Figure 21:
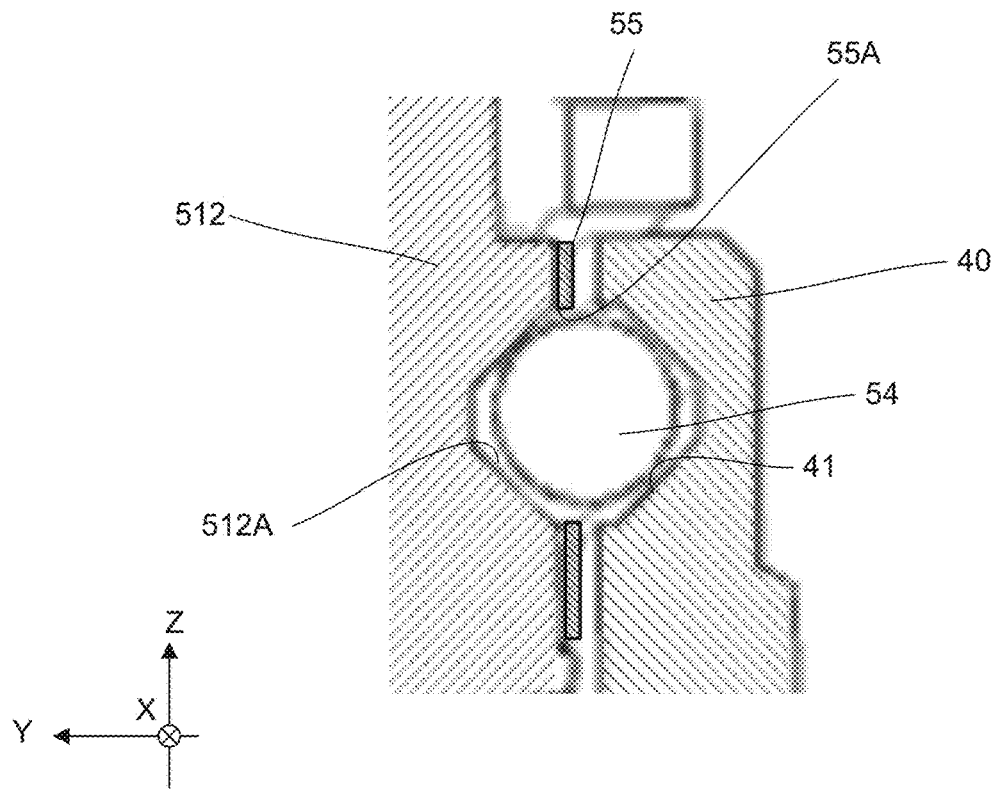
FIG. 21 is a cross-sectional side view of a portion of the cap part, the first interval holding part, and a first sliding wall.

As illustrated in FIGS. 16, 20 and 21, first sliding part 54 is a spherical member interposed between annular guide groove part 41 of cap part 40 and first sliding groove part 512A of first sliding wall 512, and forms a surface for supporting mirror housing part 50 by being interposed between cap part 40 and first sliding wall 512. A total of nine first sliding parts 54 are provided, and three thereof are provided separately at each of three positions of first sliding groove part 512A. First sliding part 54 disposed in the middle among three first sliding parts 54 disposed side by side has an interval of approximately 120 degrees from another first sliding part 54 disposed in the middle among other three first sliding parts 54 disposed side by side.

Further, first sliding part 54 disposed in the middle among three first sliding parts 54 disposed side by side is configured to have a larger diameter than other first sliding parts 54 among three first sliding parts 54 disposed side by side. For this reason, first sliding part 54 disposed in the middle slides between annular guide groove part 41 and first sliding groove part 512A (see FIG. 21). That is, first sliding part 54 is housed by annular guide groove part 41 and first sliding groove part 512A such that first sliding part 54 is capable of sliding in accordance with rotation of mirror housing part 50.

As described above, first sliding part 54 interposed between cap part 40 and first sliding wall 512 is formed of a spherical member. Accordingly, when mirror housing part 50 rotates around the Y direction, first sliding part 54 slides while rolling between annular guide groove part 41 and first sliding groove part 512A. That is, first sliding part 54 follows the rotation of mirror housing part 50. Thus, mirror housing part 50 can smoothly rotate around the Y direction.

Further, since cap part 40 is urged toward mirror housing part 50 by urging part 33 (annular part 331) (see FIG. 13), cap part 40 functions as a thrust bearing that receives a load of mirror housing part 50 in the Y direction (thrust direction) in the end part on the − side in the Y direction. Thus, it is possible to reduce a burden on camera module 1 in the Y direction.

First interval holding part 55 is a flat plate member that holds intervals between a plurality of first sliding parts 54, and is disposed by being held between a portion corresponding to first sliding groove part 512A of first sliding wall 512 and cap part 40 so as to be orthogonal to the Y direction. First interval holding part 55 is configured to be in a circular shape corresponding to the portion corresponding to first sliding groove part 512A of first sliding wall 512 and cap part 40.

First interval holding part 55 includes three holes 55A each of which allows three first sliding parts 54 to be disposed side by side. Three first sliding parts 54 are disposed in each of three holes 55A. In first interval holding part 55, portions 551 other than holes 55A form partition parts that partition an annular opening part of first sliding groove part 512A into a plurality of partitioned opening parts and individually dispose the plurality of first sliding parts 54. Three holes 55A are disposed at positions corresponding to the plurality of partitioned opening parts of first sliding groove part 512A. In other words, first interval holding part 55 is a flat plate member that forms the partition parts with three holes 55A.

Thus, when mirror housing part 50 rotates around the rotation axis along the Y direction, the intervals between first sliding parts 54 are held such that the intervals are aligned within a predetermined angular range in a direction of the rotation of mirror housing part 50. As a result, the intervals of approximately 120 degrees are held with respect to the center of rotation (the center of first interval holding part 55). Accordingly, the disposition balance between first sliding parts 54 improves and further the rotation of mirror housing part 50 can be stabilized.

Further, first interval holding part 55 is formed of a member different from those of first sliding groove part 512A (housing casing 51) and annular guide groove part 41 (cap part 40). Accordingly, when the positions of first sliding parts 54 are adjusted, there is no need to recreate housing casing 51 and cap part 40. Specifically, it is sufficient to appropriately adjust the positions at which holes 55A of first interval holding parts 55 are drilled, and thus, it is possible to significantly reduce the designing (working) man-hours for adjusting the positions of first sliding parts 54.

Further, since first interval holding part 55 is formed of a flat plate member, it is easier to adjust the positions of holes 55A, and further it is possible to significantly reduce the designing man-hours described above.

Further, in the present embodiment, first sliding groove part 512A and annular guide groove part 41 are configured to extend in an annular shape, and thus, it is possible to house the plurality of first sliding parts 54 collectively. For this reason, in comparison with a configuration in which the positions of the first sliding parts are defined within the groove parts, it is easier to dispose first sliding parts 54 within the groove parts and to adjust the intervals between first sliding parts 54 with first interval holding part 55.

Further, since first interval holding part 55 is formed of a flat plate member and therefore does not take width in the Y direction (the outgoing direction of reflected light L2), it is possible to reduce the size of housing casing 51 in the Y direction.

Further, first interval holding part 55 is disposed in a fixed state with respect to mirror housing part 50, for example. Specifically, first interval holding part 55 is fixed to a portion corresponding to first sliding parts 54 with, for example, an adhesive or the like.

For this reason, even when a force that cause the positional relationship between first sliding part 54 and mirror housing part 50 to deviate is generated, the positional relationship between first sliding part 54 and mirror housing part 50 is maintained within a predetermined range (within the range of hole 55A) since first interval holding part 55 is fixed to mirror housing part 50.

In the present embodiment, first sliding part 54 is a spherical member. Accordingly, when mirror housing part 50 rotates around the rotation axis along the Y direction, first sliding part 54 slides while rolling. For this reason, even when a force that cause the positional relationship between first sliding part 54 and mirror housing part 50 to deviate is generated, mirror housing part 50 can be smoothly rotated.

Further, since first sliding groove part 512A has a shape which tapers toward the + side in the Y direction and annular guide groove part 41 has a shape which tapers toward the − side in the Y direction, first sliding part 54 can be supported at two points in each groove part. As a result, it is possible to make the position of first sliding part 54 more stable within each groove part.

Figure 22:
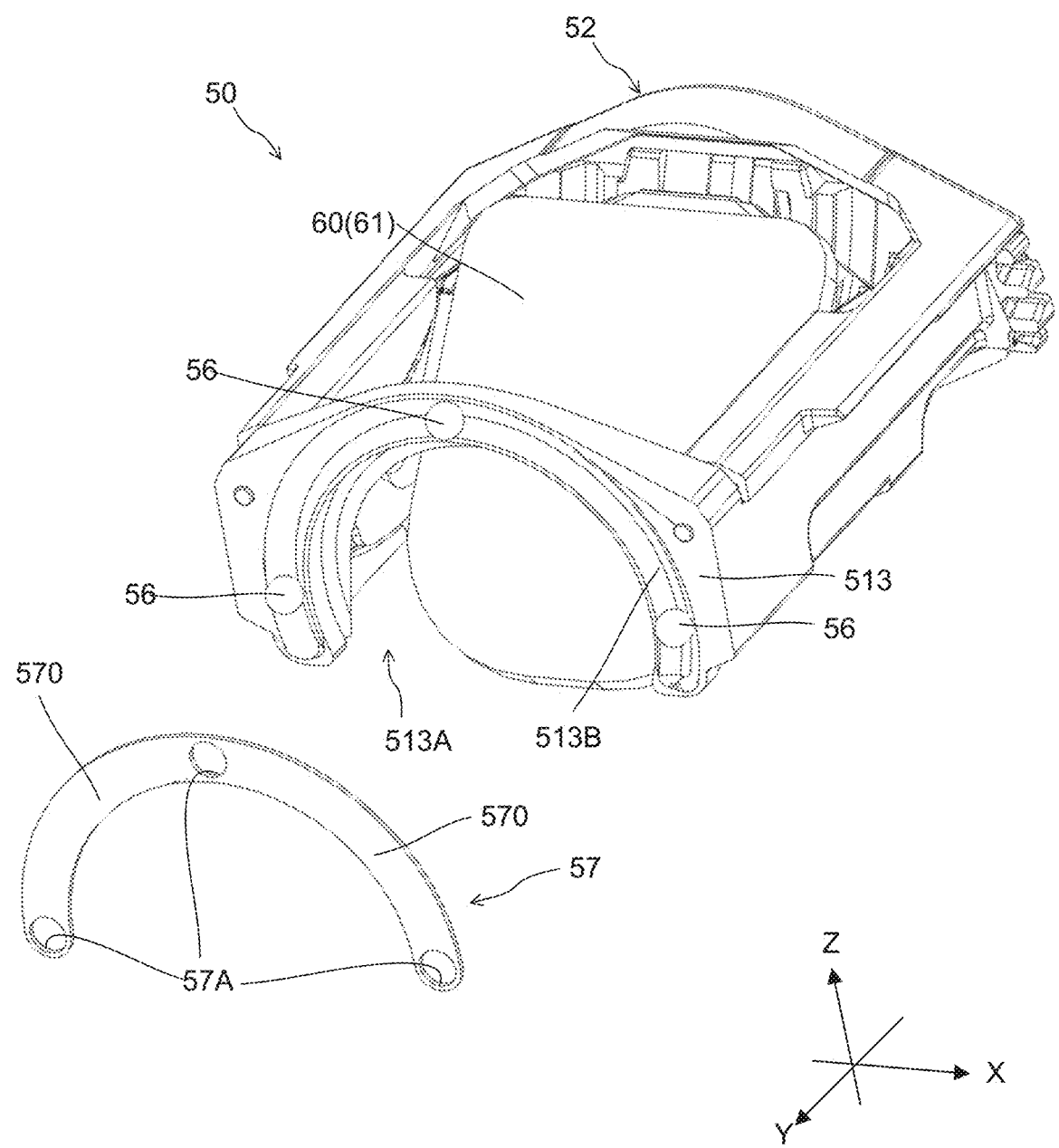
FIG. 22 is an exploded perspective view in which a second interval holding part is removed from the mirror housing part.
Figure 23:
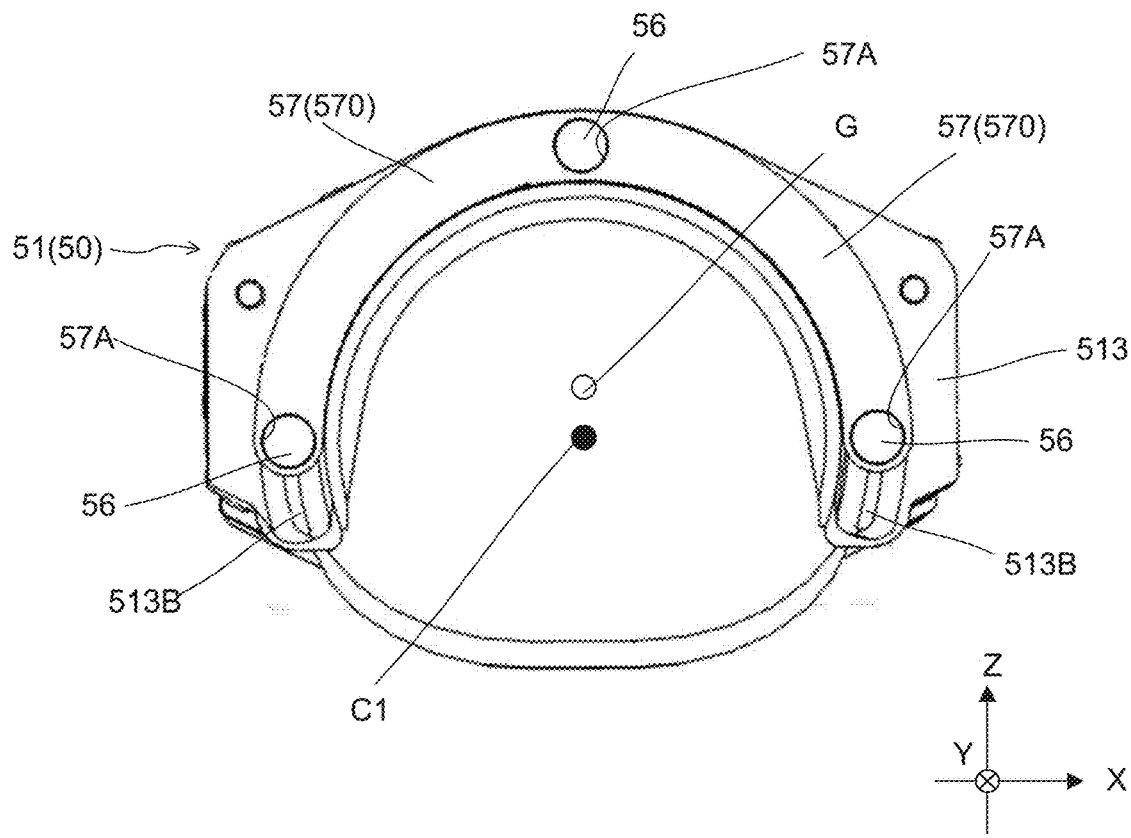
FIG. 23 illustrates the second interval holding part and second sliding parts.
Figure 24:
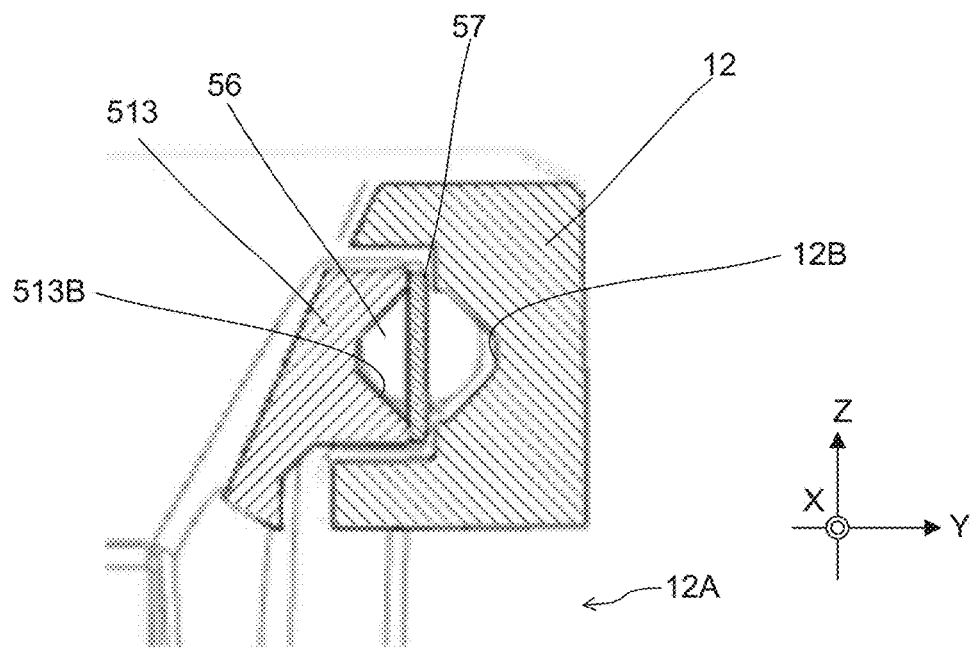
FIG. 24 is a cross-sectional side view of a portion of an outgoing wall, the second interval holding part, and a second sliding wall.

As illustrated in FIGS. 22, 23 and 24, second sliding part 56 is a spherical member interposed between arc-shaped guide groove part 12B of outgoing wall 12 described above and second sliding groove part 513B of second sliding wall 513, and form a surface for supporting mirror housing part 50 by being interposed between outgoing wall 12 and second sliding wall 513. A total of three second sliding parts 56 are provided, and are provided separately at three positions of arc-shaped guide groove part 12B and second sliding groove part 513B. Among three second sliding parts 56, two second sliding parts 56 adjacent to each other are disposed at a predetermined interval.

The predetermined interval is an angle that can be set in accordance with the shapes of the arcs of arc-shaped guide groove part 12B and second sliding groove part 513B, and is an angle of at least less than 120 degrees. In the present embodiment, it is approximately 90 degrees (see FIG. 23).

As described above, second sliding part 56 interposed between outgoing wall 12 and second sliding wall 513 is formed of a spherical member. Accordingly, when mirror housing part 50 rotates around the rotation axis along the Y direction, second sliding part 56 slides while rolling between arc-shaped guide groove part 12B and second sliding groove part 513B. That is, second sliding part 56 is housed by arc-shaped guide groove part 12B and second sliding groove part 513B so as to be capable of sliding in accordance with the rotation of mirror housing part 50 and follows the rotation of mirror housing part 50. Thus, mirror housing part 50 can smoothly rotate around the Y direction.

Second interval holding part 57 is a flat plate member that holds intervals between a plurality of second sliding parts 56, and is disposed by being held between a portion corresponding to second sliding groove part 513B of second sliding wall 513 and a portion corresponding to arc-shaped guide groove part 12B of outgoing wall 12 so as to be orthogonal to the Y direction. Second interval holding part 57 is configured to be in an arc shape which protrudes to the + side in the Z direction correspondingly to the portion corresponding to second sliding groove part 513B and the portion corresponding to arc-shaped guide groove part 12B.

Second interval holding part 57 includes three holes 57A each of which allows one second sliding part 56 to be disposed therein. Second sliding part 56 is disposed in each of three holes 57A. In second interval holding part 57, portions 570 other than holes 57A form partition parts that partition an annular opening part of second sliding groove part 513B into a plurality of partitioned opening parts and individually dispose the plurality of second sliding parts 56. Three holes 57A are disposed at positions corresponding to the plurality of partitioned opening parts of second sliding groove part 513B. In other words, second interval holding part 57 is a flat plate member that forms the partition parts with three holes 57A. Thus, second interval holding part 57 holds three second sliding parts 56 such that three second sliding parts 56 are aligned at equal intervals in the direction of the rotation of mirror housing part 50.

Accordingly, when mirror housing part 50 rotates around the rotation axis along the Y direction, the intervals between second sliding parts 56 are held such that the intervals are aligned within a predetermined angular range in the direction of the rotation of mirror housing part 50. As a result, the disposition balance between second sliding parts 56 improves, and thus, the rotation of mirror housing part 50 can be stabilized.

Further, second interval holding part 57 is formed of a member different from those of second sliding groove part 513B (housing casing 51) and arc-shaped guide groove part 12B (outgoing wall 12). Accordingly, when the positions of second sliding parts 56 are adjusted, there is no need to recreate housing casing 51 and outgoing wall 12. Specifically, it is sufficient to appropriately adjust the positions at which holes 57A of second interval holding part 57 are drilled, and thus, it is possible to significantly reduce the designing (working) man-hours for adjusting the positions of second sliding parts 56.

Further, since second interval holding part 57 is formed of a flat plate member, it is easier to adjust the positions of holes 57A, and further it is possible to significantly reduce the designing man-hours described above.

Further, in the present embodiment, second sliding groove part 513B and arc-shaped guide groove part 12B are configured to extend in an arc shape, and thus, it is possible to house the plurality of second sliding parts 56 collectively. For this reason, in comparison with a configuration in which the positions of the second sliding parts are defined within the groove parts, it is easier to dispose second sliding parts 56 within the groove parts and to adjust the intervals between second sliding parts 56 with second interval holding part 57.

Further, since second interval holding part 57 is formed of a flat plate member and therefore does not take width in the Y direction (the outgoing direction of reflected light L2), it is possible to reduce the size of housing casing 51 in the Y direction.

Further, second interval holding part 57 is disposed in a non-fixed state with respect to mirror housing part 50 and outgoing wall 12. The non-fixed state refers to a state in which second interval holding part 57 is not fixed to any portion by a fastening member such as a screw and is not bonded, welded, or the like, to any portion.

For this reason, in a case where a force that cause the positional relationship between second sliding part 56 and mirror housing part 50 to deviate is generated, second sliding parts 56 push edges of holes 57A of second interval holding part 57 and second interval holding part 57 also follows the movement of second sliding parts 56.

Thus, the position of second interval holding part 57 is stabilized between mirror housing part 50 and outgoing wall 12, and thus, it is easier for each second sliding part 56 to move to a position at which it is easier for each second sliding part 56 to strike a balance when mirror housing part 50 rotates. Further, since second interval holding part 57 also moves in the direction of the rotation, the intervals between second sliding parts 56 do not fluctuate and the rotation of mirror housing part 50 can be stabilized.

Further, in the present embodiment, from the viewpoint of reducing the height of casing 10, second sliding groove part 513B and arc-shaped guide groove part 12B are configured to be in an arc shape which protrudes to the + side in the Z direction and are configured such that a portion of a circle, which is formed by the arc, on the − side in the Z direction is notched. In other words, center of rotation C1 of mirror housing part 50 around the Y direction is located more on the − side in the Z direction than center of gravity G of mirror housing part 50. For this reason, second sliding groove part 513B and arc-shaped guide groove part 12B are not formed in a circular shape.

For this reason, it is inevitable to relatively reduce the intervals between second sliding parts 56. In a case where the second sliding groove part can be configured to be in a circular shape, it is possible to set the interval between three second sliding parts 56 to 120 degrees and a disposition balance between second sliding parts 56 can be easily struck, and thus, the rotation of mirror housing part 50 can be stabilized.

In the present embodiment, on the other hand, the intervals between second sliding parts 56 are configured to be likely to be relatively small, and thus, each second sliding part 56 is likely to be shifted to, for example, the + side in the Z direction with respect to center of rotation C1 to reach a state in which no second sliding part 56 is present on the − side in the Z direction with respect to center of rotation C1.

In other words, the present embodiment has a configuration that it is hard to strike a disposition balance between second sliding parts 56.

Nonetheless, in the present embodiment, the positional relationship between second sliding parts 56 no longer deviates due to second interval holding part 57. For this reason, even in a configuration in which it is hard to strike a disposition balance between second sliding parts 56, the rotation of mirror housing part 50 can be stabilized. As a result, a reduction in the height of mirror housing part 50 (housing casing 51) can be realized.

Further, in the present embodiment, urging part 33 described above is configured to urge mirror housing part 50 toward the + side in the Y direction (a side of outgoing wall 12). Accordingly, since second sliding parts 56 are pressed against arc-shaped guide groove part 12B by an urging force of urging part 33, it is easier to maintain the disposition balance between second sliding parts 56, and further the rotation of mirror housing part 50 can be stabilized.

Further, since second interval holding part 57 follows the movement of second sliding parts 56 as described above, second sliding parts 56 can freely move, while holding the intervals between second sliding parts 56, to positions at which second sliding parts 56 easily strike a balance therebetween in accordance with the rotation position of mirror housing part 50. As a result, the rotation of mirror housing part 50 can be stabilized.

Further, since second sliding groove part 513B has a shape which tapers toward the − side in the Y direction and arc-shaped guide groove part 12B has a shape which tapers toward the + side in the Y direction, second sliding part 56 can be supported at two points in each groove part. As a result, it is possible to make the position of second sliding part 56 more stable within each groove part.

Next, mirror holding part 60 will be described. As illustrated in FIG. 17, mirror holding part 60 is a portion that holds mirror element part 61 and is housed so as to be attachable to and detachable from mirror housing part 50. Mirror holding part 60 is disposed in mirror guide part 511 within mirror housing part 50 and is configured to slide-movable on mirror guide part 511. Mirror holding part 60 corresponds to the "optical element holding part" of the present invention.

Mirror guide part 511 is provided with rotation guide groove parts 511A having an arc shape as described above. Mirror holding part 60 is configured to be rotatable around a rotation axis (second rotation axis) along the X direction by slide-move on rotation guide groove parts 511A.

Figure 25:
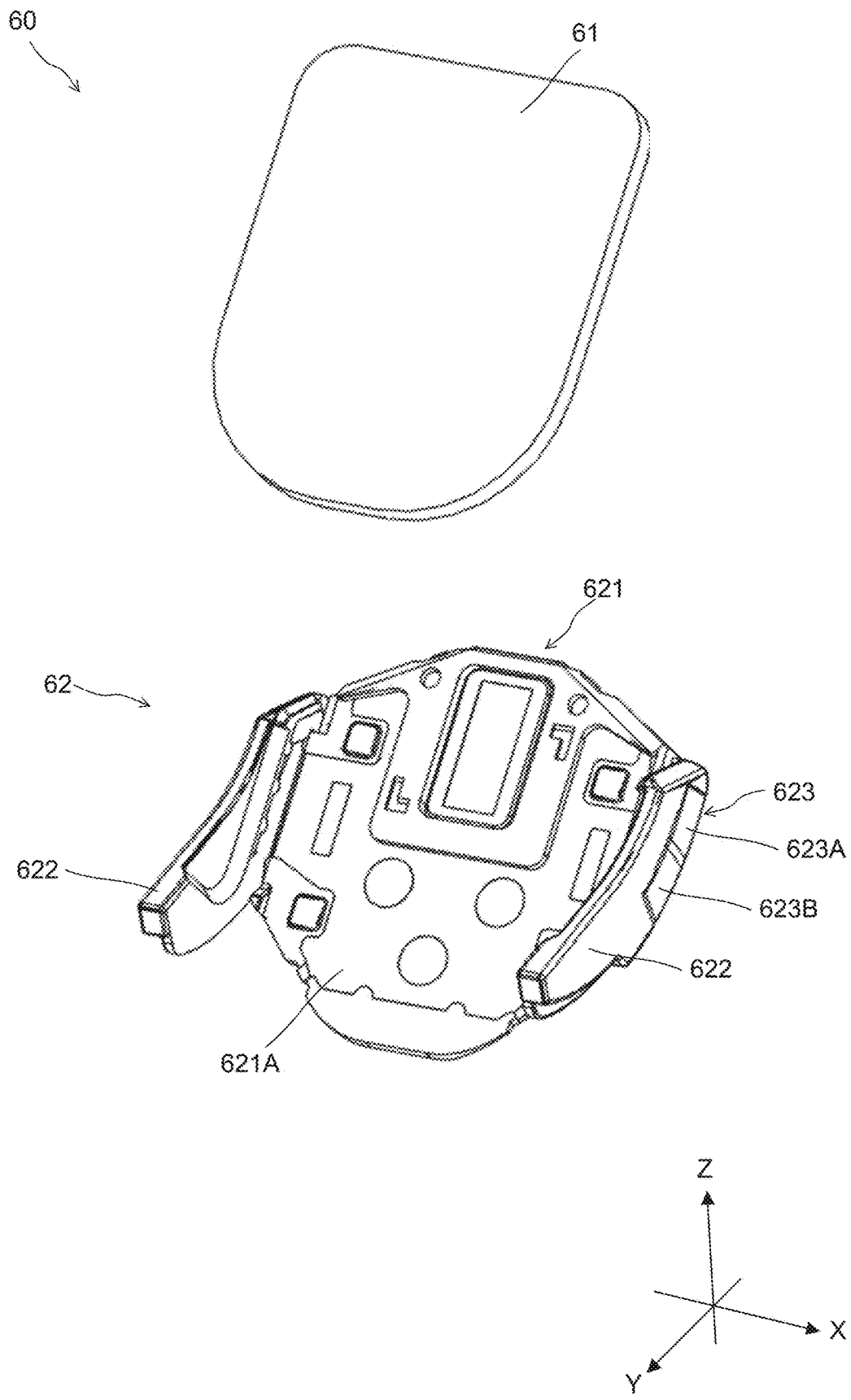
FIG. 25 is an exploded perspective view in which a mirror element part is removed from the mirror holding part.
Figure 26:
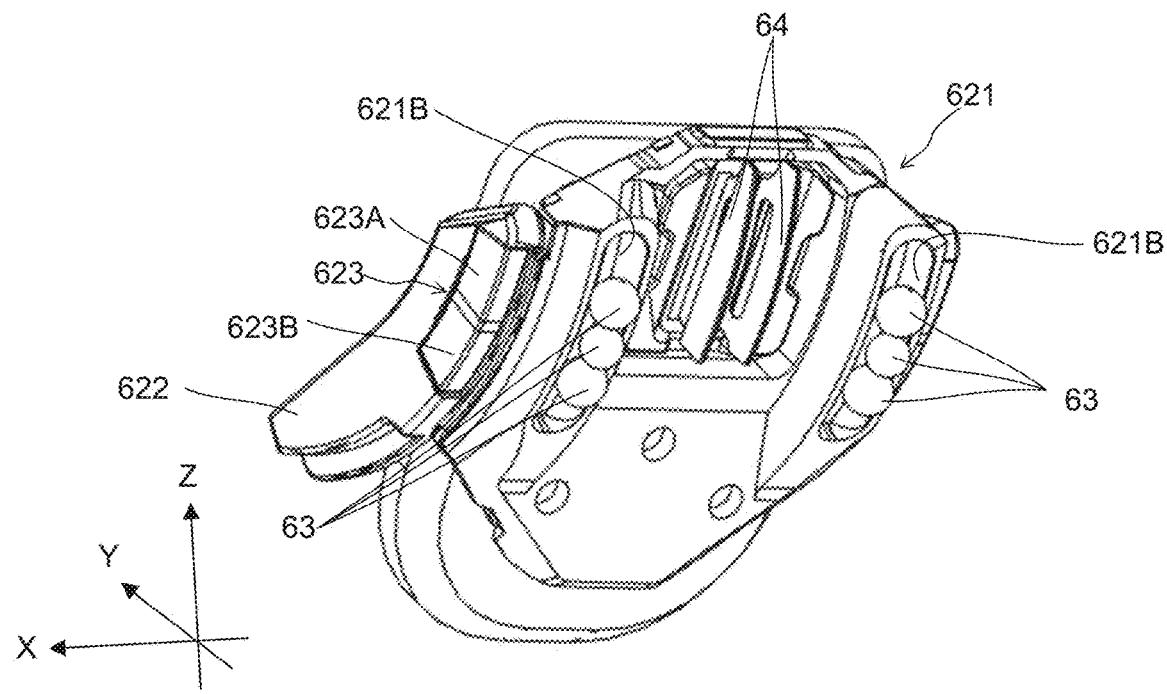
FIG. 26 is a perspective view of the mirror holding part viewed from a side opposite to a side on which the mirror element part is disposed.

As illustrated in FIGS. 25 and 26, mirror holding part 60 includes mirror element part 61, holding casing 62, third sliding part 63, and holding contact part 64.

Mirror element part 61 includes a mirror element (optical element) capable of reflecting incident light L1 and is configured to have a substantially rectangular shape.

Since rotation guide groove part 511A has an arc shape which protrudes in an oblique direction toward the − side in the Z direction and the − side in the Y direction, mirror holding part 60 is disposed on rotation guide groove parts 511A to thereby be disposed to be inclined with respect to the Z direction and the Y direction (see FIG. 28 or the like).

That is, mirror element part 61 is disposed to be capable of bending incident light L1 such that incident light L1 travels toward one direction (the + side) in a direction (the Y direction) different from the direction along incident light L1 (the Z direction). Mirror element part 61 corresponds to the "optical element part" of the present invention.

As illustrated in FIG. 25, holding casing 62 is a portion that holds mirror element part 61 and slide-moves mirror guide part 511, and includes main body part 621 and magnet holding part 622.

Main body part 621 is a portion to which mirror element part 61 is fixed, and includes fixing surface 621A to which mirror element part 61 can be fixed. Main body part 621 is disposed in mirror guide part 511 such that fixing surface 621A faces the + side in the Z direction. Mirror element part 61 is bonded and fixed to fixing surface 621A with an adhesive or the like, for example. Note that, it does not matter how mirror element part 61 is fixed to main body part 621.

As illustrated in FIG. 26, in main body part 621, the surface facing the − side in the Z direction is provided with third sliding groove parts 621B. Third sliding groove part 621B is configured to be in an arc shape which protrudes to the − side in the Z direction such that third sliding groove part 621B can be disposed along rotation guide groove part 511A described above. Third sliding groove part 621B has a shorter arc length than rotation guide groove part 511A (guide surface) of mirror guide part 511 and is a guided surface that is guided by rotation guide groove part 511A.

Figure 27:
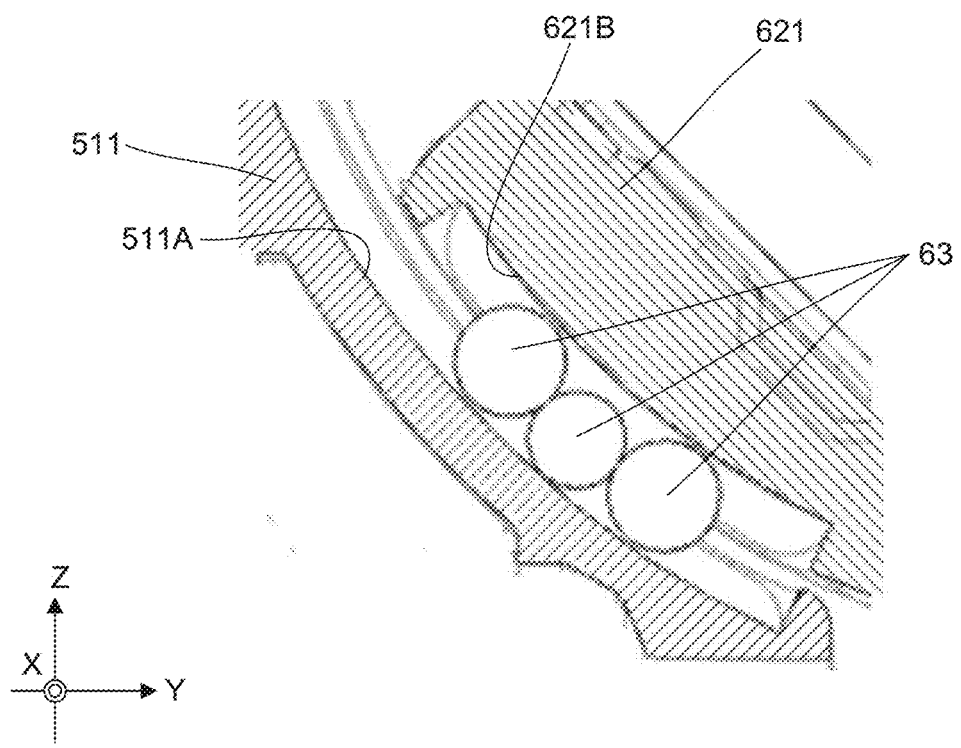
FIG. 27 is a cross-sectional side view of a sliding portion between the mirror holding part and a mirror guide part.

Third sliding groove parts 621B are provided in the both end parts of main body part 621 in the X direction, respectively, and are provided at positions at which third sliding groove part 621B faces rotation guide groove part 511A in the Z direction (see FIG. 27). Third sliding groove part 621B has a groove shape which tapers toward the bottom thereof (on the + side in the Z direction).

Third sliding part 63 is a spherical member interposed between rotation guide groove part 511A and third sliding groove part 621B. Three third sliding parts 63 are provided in each of the both end parts of main body part 621 in the X direction. Three third sliding parts 63 on one side (the + side or the − side) in the X direction are disposed side by side along the groove shape of third sliding groove part 621B.

As described above, third sliding part 63 interposed between rotation guide groove part 511A and third sliding groove part 621B is formed of a spherical member. Accordingly, when mirror holding part 60 rotates around the rotation axis along the X direction, third sliding part 63 slides while rolling between rotation guide groove part 511A and third sliding groove part 621B (see FIG. 27). Thus, mirror holding part 60 smoothly rotates around the rotation axis along the X direction.

Further, holding contact part 64 is attached to the surface facing, in main body part 621, the − side in the Z direction. Holding contact part 64 is provided between third sliding groove parts 621B in the both end parts of main body part 621 in the X direction and is disposed at a position at which holding contact part 64 can come into contact with resonance part 511B of mirror guide part 511 described above (see FIG. 17). Holding contact part 64 gives pressurization for rotationally driving mirror holding part 60 to mirror holding part 60 by coming into contact with resonance part 511B in vibration.

That is, resonance part 511B and holding contact part 64 form an ultrasonic motor that serves as the driving part (second driving part) that rotationally drives mirror holding part 60 around the X direction, that is, drives mirror holding part 60 such that mirror holding part 60 moves on mirror guide part 511. Note that, the second driving part may be other than an ultrasonic motor, such as a VCM.

Further, as illustrated in FIG. 28, when mirror holding part 60 maximally rotates to the + side in the Z direction (see the broken line), main body part 621 moves to a position at which the end part of main body part 621 on the + side in the Z direction faces regulation cover part 52 described above and does not come into contact with first regulation wall 521A. The presence of first regulation wall 521A makes it possible to regulate movement of main body part 621 to the + side in the Z direction even in a case where main body part 621 excessively moves or in a case where an external force to move to the + side in the Z direction is given to main body part 621.

As illustrated in FIGS. 25 and 26, magnet holding parts 622 are provided in the both end parts of main body part 621 in the X direction, and protrude to the + side in the Z direction and to the + side in the Y direction from the both end parts, respectively.

As illustrated in FIGS. 28 and 29, magnet holding part 622 is disposed at a position at which magnet holding part 622 faces second regulation wall 522A of regulation cover part 52 described above in the Z direction. The amount of projection of magnet holding part 622 to the + side in the Z direction is such an amount of projection in which magnet holding part 622 does not come into contact with second regulation wall 522A. The presence of second regulation wall 522A makes it possible to regulate movement of main body part 621 to the + side in the Z direction even when an external force to move to the + side in the Z direction is given to main body part 621.

Further, as illustrated in FIG. 29, magnet holding part 622 faces regulation part 514A of side wall 514 described above in the Y direction. When mirror holding part 60 maximally rotates to the + side in the Y direction, magnet holding part 622 moves to a position at which the end part of magnet holding part 622 on the + side in the Y direction does not come into contact with regulation part 514A (see the broken line). The presence of regulation part 514A makes it possible to regulate the movement of mirror holding part 60 to the + side in the Y direction even in a case where mirror holding part 60 excessively moves or in a case where an external force to move to the + side in the Y direction is given to mirror holding part 60.

As illustrated in FIGS. 25 and 26, magnet holding part 622 is provided with magnet part 623. Magnet part 623 includes first pole 623A and second pole 623B that are disposed adjacent to each other in the Y direction. First pole 623A is an S-pole magnet and second pole 623B is an N-pole magnet.

Figure 30:
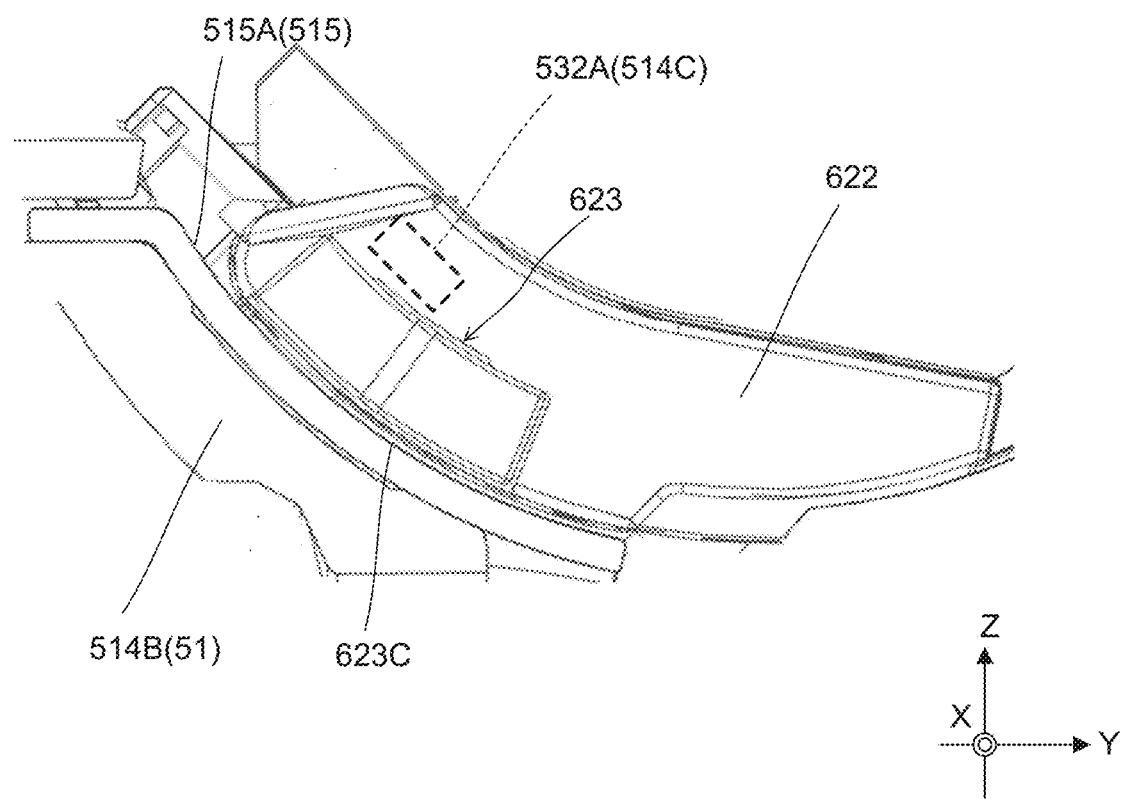
FIG. 30 is a side view of a portion at which a magnet part and a yoke part face each other.

As illustrated in FIG. 30, in magnet holding part 622, the portion that holds magnet part 623 is provided at a position at which the portion faces yoke disposing part 514B of housing casing 51 described above in the Z direction. Magnet holding part 622 has a shape in which the surface thereof on the − side in the Z direction is along yoke disposing part 514B (yoke part 515). Specifically, magnet holding part 622 includes second surface 623C which is movable along first surface 515A of yoke part 515 in accordance with the movement of mirror holding part 60 and has the same curvature as first surface 515A (rotation guide groove part 511A).

By magnet holding part 622 holding magnet part 623, magnet part 623 is disposed to face yoke part 515 in yoke disposing part 514B.

Thus, magnet part 623 and yoke part 515 attract each other magnetically. That is, magnet part 623 and yoke part 515 generate pressurization for magnetically attracting mirror holding part 60 to housing casing 51.

As a result, mirror holding part 60 is in a state of being attracted to housing casing 51 even when mirror holding part 60 is rotationally driven or when an external force is given to mirror holding part 60. Accordingly, mirror holding part 60 can reliably hold mirror element part 61 within casing 10.

Incidentally, as illustrated in FIGS. 28 and 29, in the present embodiment, from the viewpoint of simplifying casing 10 and reducing the height thereof, the curved shape formed by rotation guide groove part 511A and third sliding groove part 621B is set such that the amount of movement of mirror holding part 60 in the Y direction is relatively large and the amount of movement of mirror holding part 60 in the Z direction is relatively small. For this reason, center of rotation C2 in the rotation axis of mirror holding part 60 according to the present embodiment is located outside housing casing 51.

To this end, mirror holding part 60 is disposed in a state of having no fixed point in housing casing 51 or is disposed in a state of having a relatively simple holding point or engaging point. In the present embodiment, mirror holding part 60 is disposed in a state of having no fixed point in housing casing 51.

That is, when casing 10 is simplified and the height thereof is reduced, a moving mechanism of mirror holding part 60 must be simplified. Accordingly, a holding portion of mirror holding part 60 (mirror element part 61) is likely to be fragile, and further mirror holding part 60 is easily detached from housing casing 51.

In the present embodiment, magnet part 623 and yoke part 515 attract each other magnetically, and thus, it is possible to reliably hold mirror holding part 60 within casing 10. That is, even when the holding portion of mirror holding part 60 is fragile, the present embodiment makes it possible to reliably hold mirror holding part 60 within housing casing 51. Further, the present embodiment can thereby make it easier to simplify casing 10 and reduce the height thereof.

Further, the present embodiment makes it possible to generate pressurization only in the portion in which rotation guide groove part 511A and third sliding groove part 621B face each other since, in the portion in which magnet part 623 and yoke part 515 face each other, pressurization for both attracting each other magnetically is generated. That is, magnet part 623 and yoke part 515 can generate pressurization outward in a direction of a normal to rotation guide groove part 511A at a position at which rotation guide groove part 511A and third sliding groove part 621B face each other and which is displaced in accordance with the movement of mirror holding part 60.

For this reason, the present embodiment can realize a simple configuration without providing a component configured to continuously urge, such as an urging member, and makes it possible to reliably hold mirror holding part 60 within housing casing 51.

Further, magnet part 623 slide-moves along first surface 515A of yoke part 515. Accordingly, even when mirror holding part 60 moves, magnet part 623 can move smoothly along first surface 515A of yoke part 515.

Further, since first surface 515A of yoke part 515 and second surface 623C of magnet part 623 have the same curvature as rotation guide groove part 511A, magnet part 623 can move on yoke part 515 more smoothly.

Further, magnet holding parts 622 are disposed along the pair of side walls 514 of housing casing 51. Position detection hole 514C described above is formed in side wall 514 on the + side in the X direction, and position detection part 532A described above is provided at the position corresponding to position detection hole 514C.

As illustrated in FIG. 30, position detection part 532A is located at a position at which position detection part 532A can detect a magnetic force of magnet part 623, and detects a change in the magnetic position of magnet part 623 of magnet holding part 622 based on the movement of mirror holding part 60. That is, position detection part 532A detects the position of mirror holding part 60.

As a result, the position control of mirror holding part 60 can be performed with good accuracy. Further, in relation to yoke part 515, magnet part 623 for causing mirror holding part 60 and housing casing 51 to attract each other can also be used as a magnet for position detection. As a result, it is not necessary to separately provide a magnet for position detection, and thus, it is possible to reduce the number of components and to further simplify the configuration.

Figure 31:
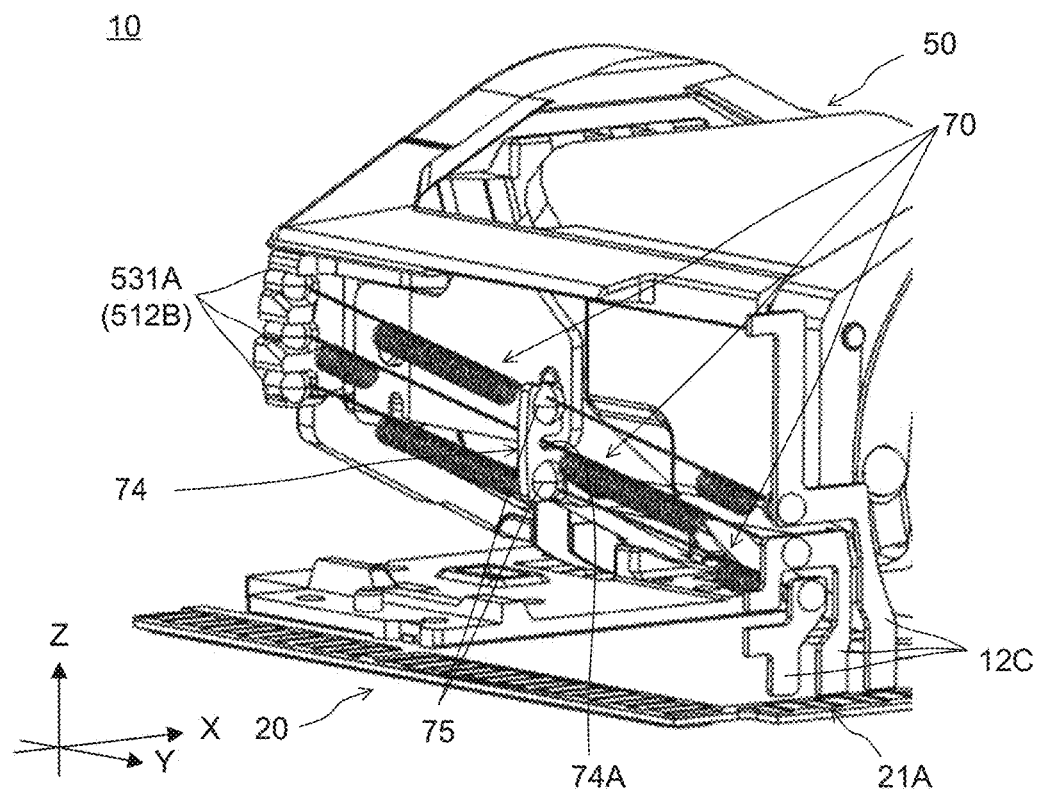
FIG. 31 is a perspective view of a portion of a power supply path part.

Next, power supply path part 70 will be described. As illustrated in FIG. 31, power supply path part 70 electrically connects board part 20 and mirror housing part 50, and forms a power supply path between board part 20 and mirror housing part 50.

Power supply path part 70 is used in, for example, power supply to resonance part 511B and position detection part 532A in mirror housing part 50. A total of six power supply path parts 70 are provided, with three thereof on the side of the positive electrode and three thereof on the side of the negative electrode. Three power supply path parts 70 on the side of the positive electrode are disposed, for example, on the − side of mirror housing part 50 in the X direction, and three power supply path parts 70 on the side of the negative electrode are disposed, for example, on the + side of mirror housing part 50 in the X direction. That is, power supply path parts 70 are provided on each of sides of the both ends of mirror housing part 50 in the X direction orthogonal to each of the Z direction and the Y direction.

Note that, FIG. 31 or the like illustrates only power supply path parts 70 on the − side in the X direction. Since power supply path parts 70 on the + side in the X direction have substantially the same shape as power supply path parts 70 on the − side in the X direction, a description thereof will be omitted. Further, although terminals 12C are inserted into outgoing wall 12, FIG. 31 or the like omits illustration of outgoing wall 12 and indicates only terminals 12C.

Figure 32:
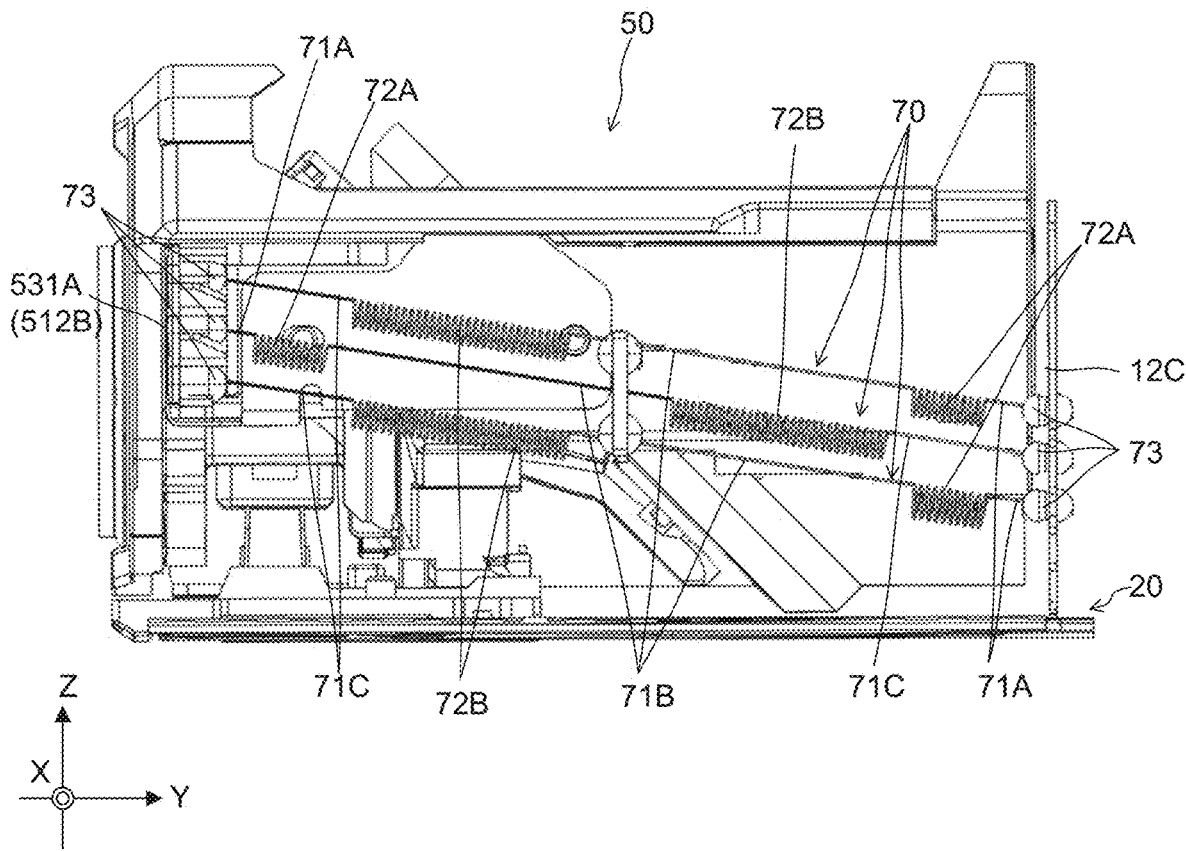
FIG. 32 is a side view of the portion of the power supply path part.

As illustrated in FIGS. 31 and 32, power supply path part 70 extends from the end part of casing 10 on the + side in the Y direction, in which terminals 12C that are connected to input/output terminals 21A of board part 20 described above are located, to the end part of casing 10 on the − side in the Y direction, in which first power supply terminals 531A of housing-side board part 53 and path holding parts 512B of mirror housing part 50 are located. That is, power supply path part 70 extends over the both end parts of mirror housing part 50 in the Y direction, and extends so as to connect terminal 12C (the terminal on a side of board part 20) and first power supply terminal 531A (the terminal on a side of mirror housing part 50) that are disposed away from each other in the Y direction.

Power supply path part 70 extends from terminal 12C described above, which is connected to input/output terminal 21A of board part 20, in a direction along the Y direction and is connected to first power supply terminal 531A of housing-side board part 53 of mirror housing part 50.

Power supply path part 70 is configured to include a spring part(s) in a portion(s). Specifically, power supply path part 70 is formed of first wire part 71A, first spring part 72A, second wire part 71B, second spring part 72B, and third wire part 71C.

First wire part 71A and third wire part 71C are wire parts located in the both end parts of power supply path part 70 in the Y direction, respectively, and are connected to board part 20 or an input/output portion (terminal 12C or first power supply terminal 531A) of housing-side board part 53 of mirror housing part 50. Damper members 73 are provided in connection portions between first wire part 71A and the input/output portion and between third wire part 71C and the input/output portion.

First wire part 71A is connected to first spring part 72A and is configured to be shorter than third wire part 71C. Third wire part 71C is connected to second spring part 72B.

Second wire part 71B connects first spring part 72A and second spring part 72B and is configured to be longer than first wire part 71A and third wire part 71C.

First spring part 72A and second spring part 72B are coil parts formed of a coil spring. First spring part 72A is disposed between first wire part 71A and second wire part 71B, and second spring part 72B is disposed between second wire part 71B and third wire part 71C. Second spring part 72B is configured to be longer than first spring part 72A.

Three power supply path parts 70 on one side (the + side or the − side) in the X direction are disposed side by side in the Z direction and disposed so as not to interfere with each other. Specifically, spring parts 72A and 72B of, among three power supply path parts 70, two power supply path parts 70 adjacent to each other in the Z direction are disposed so as to have different positions in the Y direction.

That is, for example, first wire parts 71A of power supply path part 70 on the most + side in the Z direction and power supply path part 70 on the most − side in the Z direction are connected to terminal 12C of board part 20, and third wire parts 71C thereof are connected to path holding part 512B of mirror housing part 50. Further, third wire part 71C of power supply path part 70 located in the middle in the Z direction is connected to terminal 12C of board part 20, and first wire part 71A thereof is connected to path holding part 512B of mirror housing part 50.

Further, in three power supply path parts 70 on one side in the X direction, center parts in the Y-direction are provided with position fixing part 74. Position fixing part 74 is used to maintain a mutual positional relationship between three power supply path parts 70 within a certain range. Position fixing part 74 is configured to be in a plate shape, and is configured to be capable of engaging with a portion of each second wire part 71B. Position fixing part 74 corresponds to the "maintenance part" of the present invention.

Further, in power supply path part 70 on the most + side in the Z direction and power supply path part 70 on the most − side in the Z direction, damper members 75 are provided in the engaging portions with position fixing part 74. Further, in power supply path part 70 in the middle in the Z direction, the engaging portion with position fixing part 74 is in a free state. Specifically, in position fixing part 74, portion 74A corresponding to power supply path part 70 in the middle in the Z direction is notched, and power supply path part 70 in the middle in the Z direction passes through above portion 74A.

Figure 33:
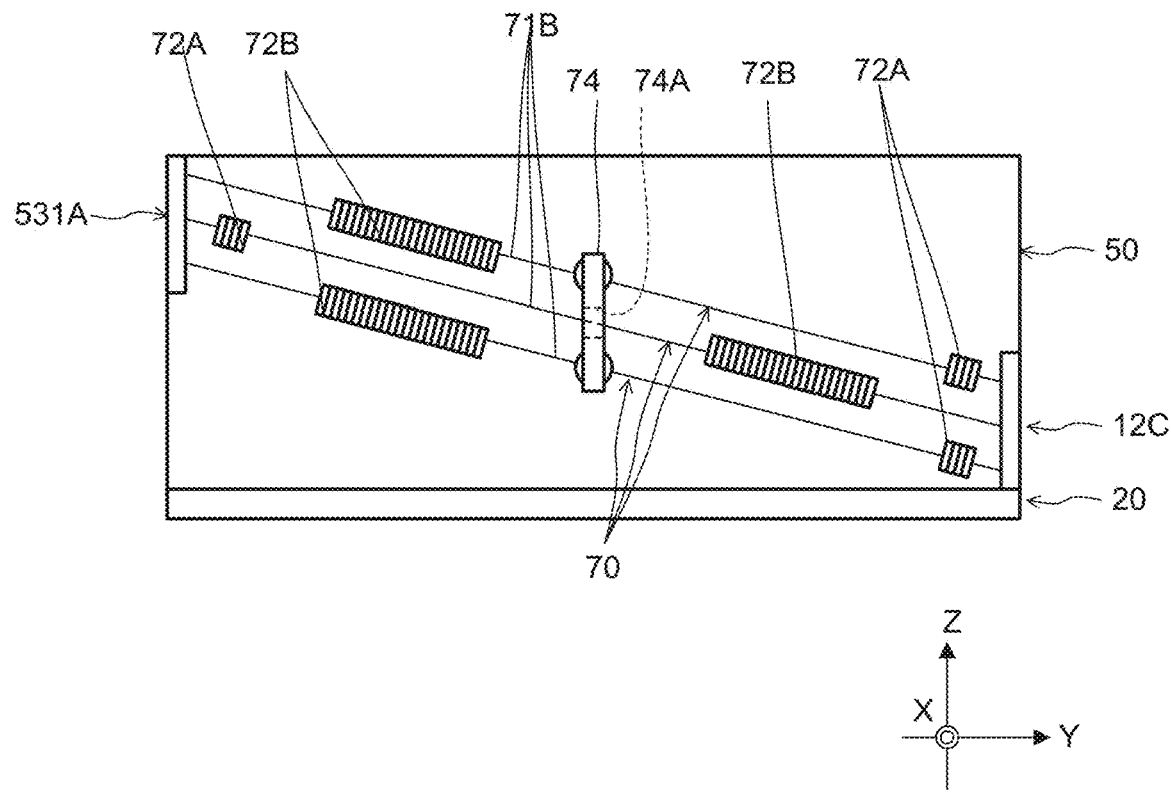
FIG. 33 is a diagram provided for describing how the power supply path part is displaced.
Figure 34:
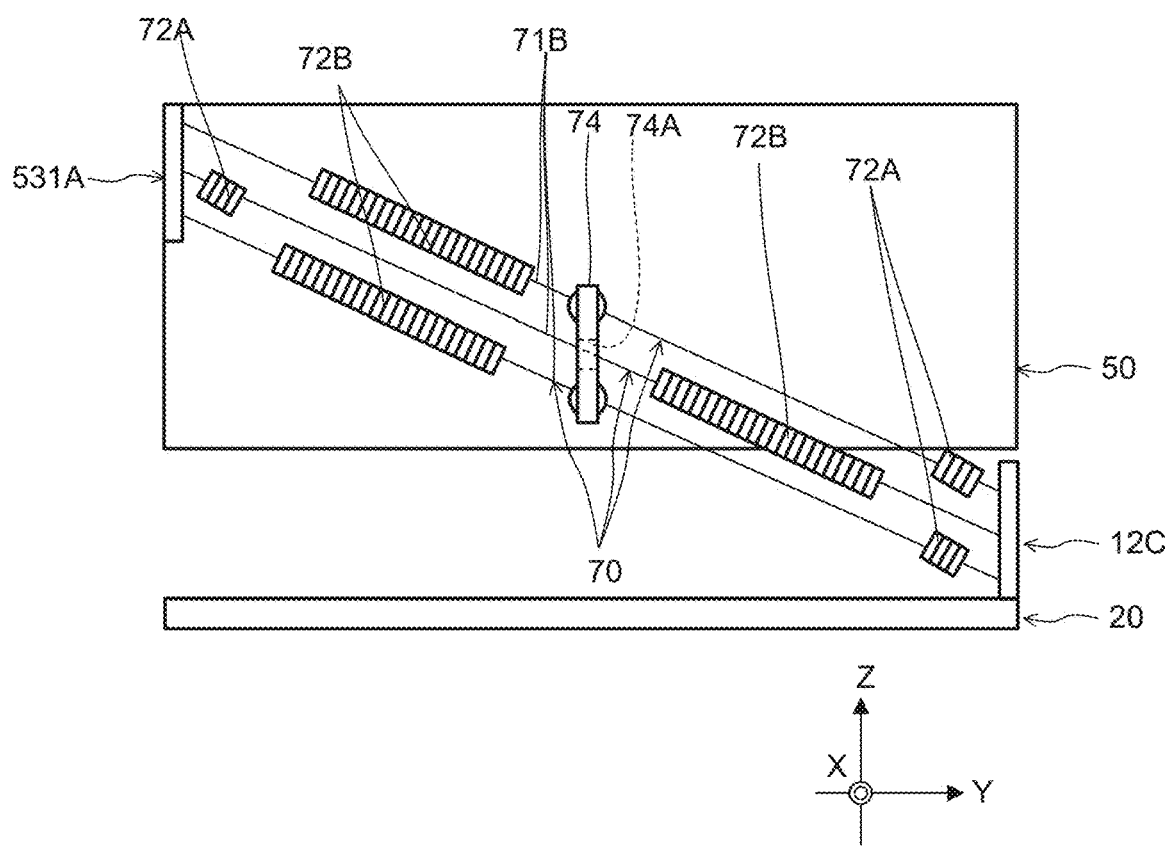
FIG. 34 is a diagram provided for describing how the power supply path part is displaced.

Incidentally, as illustrated in FIGS. 33 and 34, when mirror housing part 50 rotates around the rotation axis around the Y direction, first power supply terminal 531A of mirror housing part 50 moves to the + side or the − side in the Z direction (movement direction). In other words, mirror housing part 50 moves such that first power supply terminal 531A, which is the connection portion with power supply path part 70, approaches or separates from board part 20.

For example, it is assumed that mirror housing part 50 rotates from the position indicated in FIG. 33 to a side in which the end part thereof on the − side in the X direction is lifted, and thus, first power supply terminal 531A on the − side in the X direction moves to the + side in the Z direction. Note that, when mirror housing part 50 rotates to a side in which the end part thereof on the + side in the X direction is lifted, first power supply terminal 531A on the − side in the X direction moves to the − side in the Z direction.

Then, after the movement of mirror housing part 50, first power supply terminal 531A is located, as illustrated in FIG. 34, on the + side of the position prior to the movement (see FIG. 33) in the Z direction. Accordingly, after the movement of mirror housing part 50 (see FIG. 34), spring parts 72A and 72B are in a state of extending longer than the state prior to the movement (see FIG. 33).

In this case, for example, when aboard part and a mirror housing part are connected with a leaf spring as a power supply path part, the leaf spring has a relatively strong reaction force, and thus, the rotation of the mirror housing part is likely to be inhibited due to the reaction force.

In the present embodiment, on the other hand, power supply path part 70 extends in the Y direction and spring parts 72A and 72B are formed of a coil spring. Accordingly, the present embodiment can configure that spring parts 72A and 72B follow the rotation of mirror housing part 50 and are likely to extend and contract.

That is, spring parts 72A and 72B have a relatively low reaction force and are therefore capable of absorbing a deviation of the positional relationship between board part 20 and mirror housing part 50 before and after movement due to the rotation of mirror housing part 50. As a result, mirror housing part 50 can smoothly rotate while power is supplied to housing-side board part 53 of mirror housing part 50.

Incidentally, in a case where spring parts 72A and 72B of every power supply path part 70 are configured to have the same positions in the Y direction, two power supply path parts 70 adjacent to each other are likely to approach each other when mirror housing part 50 moves to a position at which spring parts 72A and 72B are in a long extended state as illustrated in FIG. 34, for example, and thus, the spring parts of two power supply path parts 70 likely to interfere with each other.

In the present embodiment, on the other hand, spring parts 72A and 72B of, among three power supply path parts 70, two power supply path parts 70 adjacent to each other in the Z direction have different positions in the Y direction. Accordingly, when spring parts 72A and 72B are deformed based on extension and contraction, the spring parts of two power supply path parts 70 adjacent to each other no longer interfere with each other. As a result, the power supply by two power supply path parts 70 can be accurately performed. Note that, it is also possible to provide spring parts in power supply path parts 70 in their entirety by a configuration in which the winding diameter of the spring parts of power supply path parts 70 is reduced. This configuration makes it possible to widen, without changing the intervals between the power supply path parts, the intervals between the spring parts of two power supply path parts 70 adjacent to each other in comparison with a configuration in which the winding diameter is not reduced. Accordingly, the reaction force can be further weakened in comparison with a configuration in which a spring part(s) is/are included in a portion(s), while interference of spring parts with each other is suppressed.

Further, since power supply path parts 70 can be disposed as close to each other as possible, it is possible to reduce the disposition space for power supply path parts 70, and further it is possible to achieve a reduction in the size and height of mirror housing part 50.

Further, the positional relationship between three power supply path parts 70 in the Z direction can be maintained within a certain range by providing position fixing part 74. Accordingly, it is possible to further suppress interference of three power supply path parts 70 with each other.

Further, since power supply path part 70 in the middle in the Z direction differs in the alignment of the spring parts from other two power supply path parts 70, its aspect of deformation of the spring parts when mirror housing part 50 rotates differs from those of other two power supply path parts 70. Accordingly, when power supply path part 70 described above is fixed to position fixing part 74 in the same manner as other two power supply path parts 70, the motion of power supply path part 70 by the rotation of mirror housing part 50 is affected thereby.

In the present embodiment, on the other hand, only power supply path part 70 in the middle in the Z direction is provided in a non-fixed state in position fixing part 74. As a result, it is possible to suppress the motion of power supply path part 70 described above by the rotation of mirror housing part 50 from affecting other two power supply path parts 70.

Note that, in the embodiment described above, urging part 33 is configured to be in a symmetrical shape in the Z direction (see FIG. 10) with arm part 332 on the + side in the Z direction and arm part 332 on the − side in the Z direction having the same shape, but the present invention is not limited thereto. Urging part 33 may not be configured to be in a symmetrical shape in the Z direction.

Figure 35:
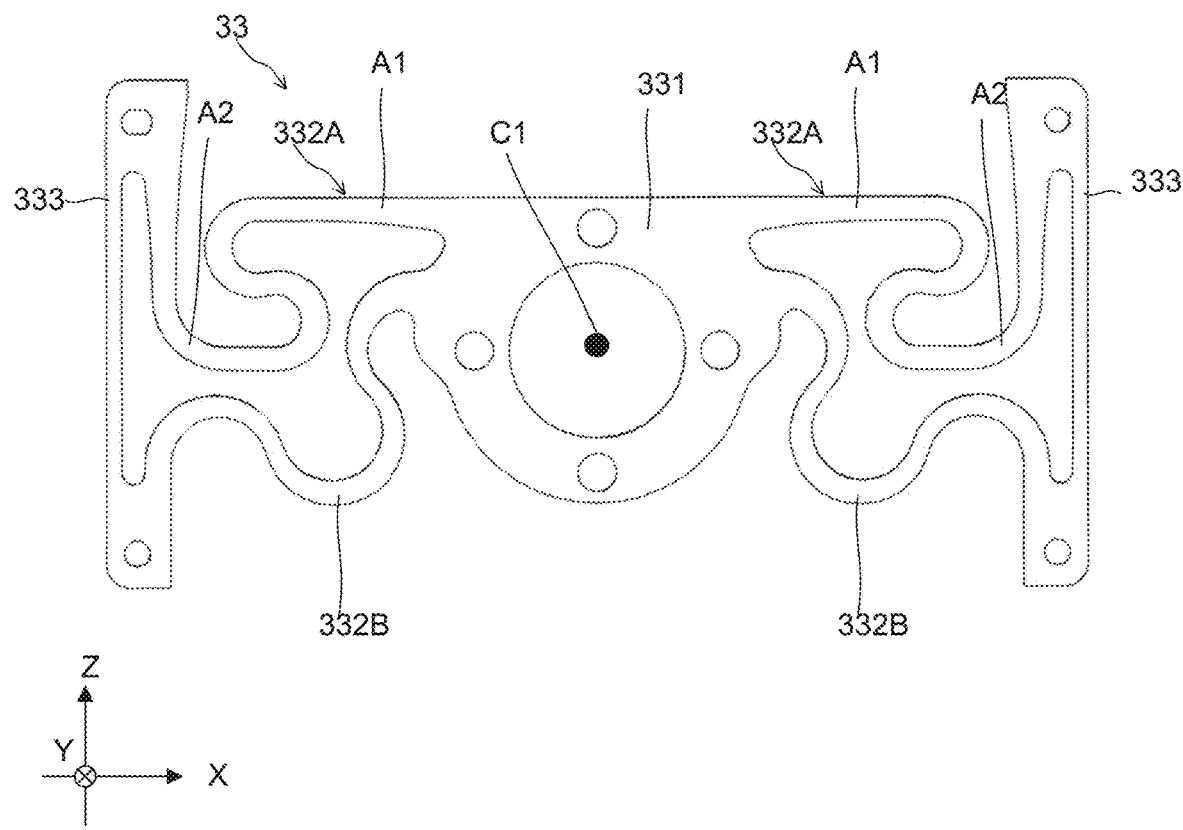
FIG. 35 illustrates an urging part according to a variation.

For example, as illustrated in FIG. 35, arm part 332A on the + side in the Z direction and arm part 332B on the − side in the Z direction in urging part 33 may have be different shapes. Arm part 332A on the + side in the Z direction includes straight line part A1 and curved part A2.

Straight line part A1 extends from the end part of annular part 331 on the + side in the Z direction toward a side of the end part of urging part 33 in the X direction. The end parts of straight line part A1 extend near connection parts of two arm parts 332A and 332B.

Curved part A2 is curved from the end part of straight line part A1 on the opposite side of annular part 331 to the − side in the Z direction, extends to a side of annular part 331 in the X direction, is then curved to the opposite side of annular part 331 in the X direction and is connected to connection part 333.

Arm part 332B on the − side in the Z direction is curved from a portion of the end part of annular part 331 in the X direction, where the portion is closer to the + side in the Z direction, to the − side in the Z direction, is then curved toward the + side in the Z direction, and is connected to connection part 333.

By urging part 33 having such a shape, an urging force at a portion thereof on the + side of center of rotation C1 of mirror housing part 50 in the Z direction is larger than an urging force at a portion thereof on the − side of center of rotation C1 in the Z direction.

In the embodiment described above, center of rotation C1 of mirror housing part 50 is configured to be located on the − side of center of gravity G of mirror housing part 50 in the Z direction, and thus, a portion of a circle, which forms the arc of second sliding groove part 513B and arc-shaped guide groove part 12B, on the − side in the Z direction is notched. For this reason, in the end part (the portion of cap part 40) of mirror housing part 50 on the − side in the Y direction, the load that is applied to the + side of center of rotation C1 in the Z direction is larger than the load that is applied to the − side of center of rotation C1 in the Z direction.

In this respect, the urging force on the + side of center of rotation C1 in the Z direction is increased by using urging part 33 illustrated in FIG. 35, to thereby allow a load in the Y direction to be easily received on a side of cap part 40 more stably and further allow the rotation of mirror housing part 50 to be stabilized.

Figure 36:
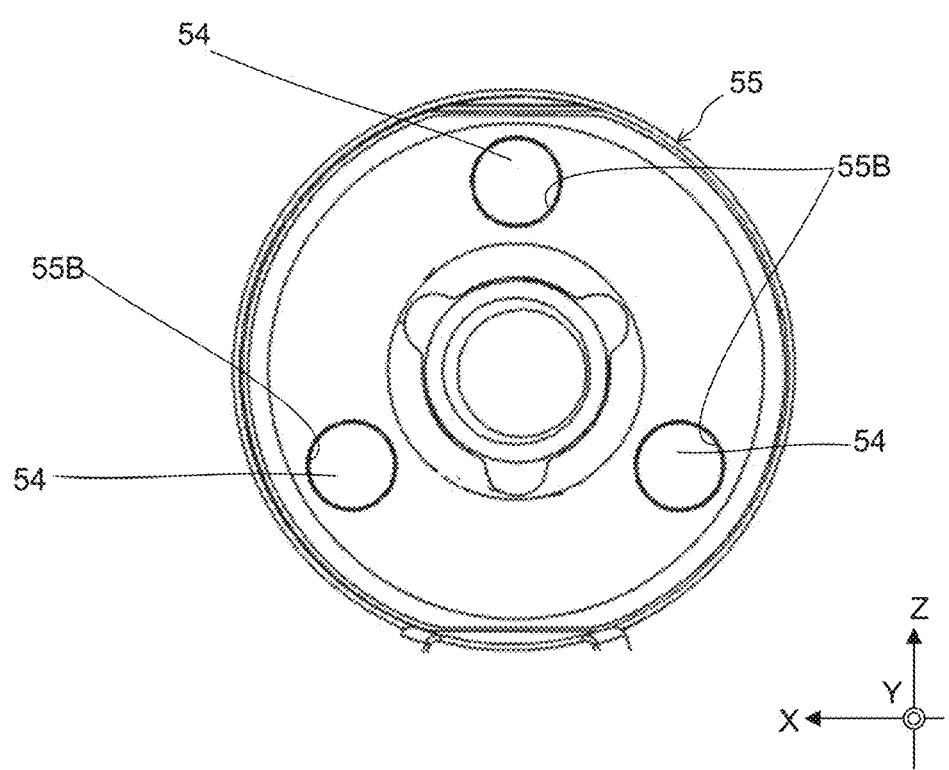
FIG. 36 illustrates a first interval holding part and first sliding parts according to a variation.

Further, in the embodiment described above, hole 55A of first interval holding part 55 has a size that allows three first sliding parts 54 to be disposed therein, but the present invention is not limited thereto. For example, as illustrated in FIG. 36, the size may allow only one first sliding part 54 to be disposed therein.

Hole 55B of first interval holding part 55 above has a diameter which is substantially equivalent to that of one first sliding part 54 and allows one first sliding part 54 to rotate within hole 55B.

With such a configuration, it is possible to maintain the intervals between of first sliding parts 54 at equal intervals.

Further, in the embodiment described above, first interval holding part 55 is fixed to mirror housing part 50, but the present invention is not limited thereto. First interval holding part 55 may be disposed in a non-fixed manner with respect to mirror housing part 50 and cap part 40.

Further, configuring first interval holding part 55 as illustrated in FIG. 36 to be in a non-fixed state makes it easier for first interval holding part 55 to follow the movement of first sliding part 54.

Figure 37:
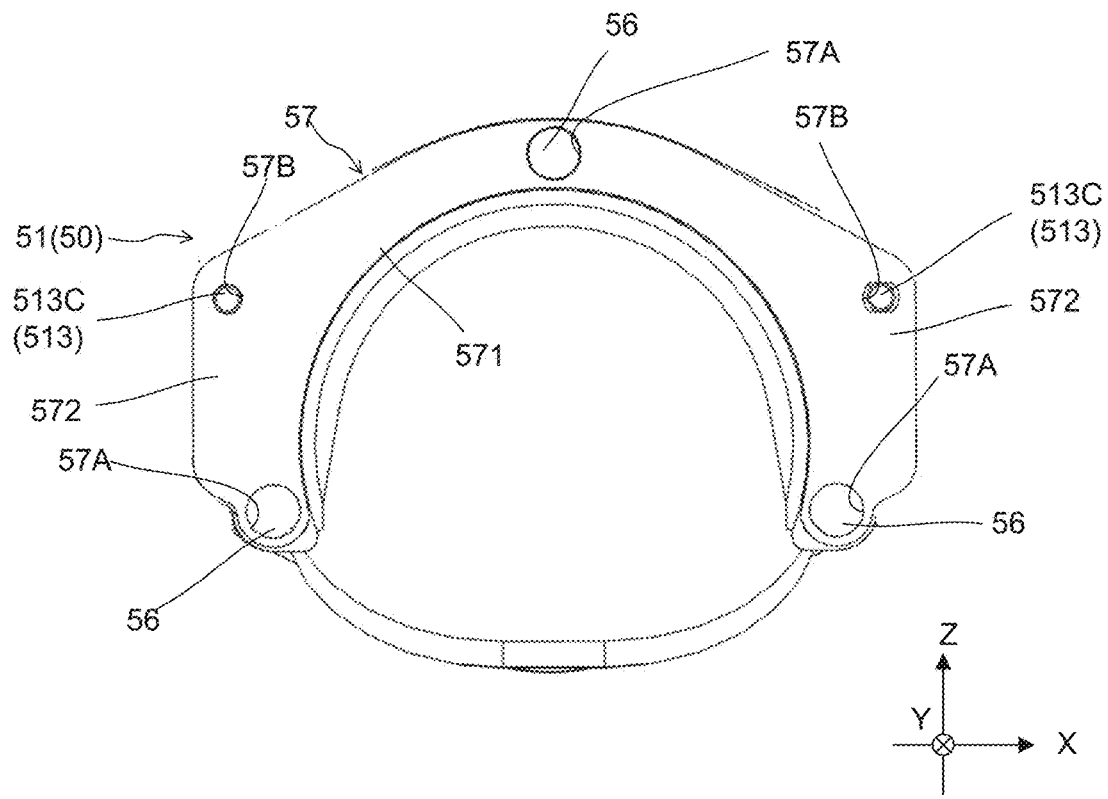
FIG. 37 illustrates a second interval holding part and second sliding parts according to a variation.

Further, in the embodiment described above, second interval holding part 57 is disposed in a non-fixed state with respect to mirror housing part 50 and outgoing wall 12, but the present invention is not limited thereto. For example, as illustrated in FIG. 37, second interval holding part 57 may be fixed to mirror housing part 50.

Second interval holding part 57 above includes arc part 571 and overhang part 572. Arc part 571 is configured to be in an arc shape which protrudes to the + side in the Z direction, and is provided at a position corresponding to second sliding groove part 513B of second sliding wall 513. Arc part 571 is provided with holes 57A in which second sliding parts 56 are disposed.

Overhang parts 572 are provided so as to overhang from arc part 571 toward sides of both ends in the X direction. Overhang part 572 is provided with engaging hole 57B. Further, in the both end parts of second sliding wall 513 in the X direction, positions corresponding to engaging holes 57B are provided with projection parts 513C that are projected to the + side in the Y direction. Second interval holding part 57 is fixed to mirror housing part 50 by engaging holes 57B engaging with projection parts 513C.

Further, the intervals between holes 57A may be the maximum interval by second interval holding part 57 being disposed in a fixed state. The maximum interval is appropriately set in accordance with second sliding groove part 513B. In this way, the intervals between second sliding parts 56 can be configured to be as close to 120 degrees as possible.

Further, in the configuration illustrated in FIG. 37, the positions of second sliding parts 56 are configured to be fixed, accompanied by the fixing of second interval holding part 57, but the present invention is not limited thereto. It may also be configured such as second sliding part 56 is allowed to move.

Figure 38:
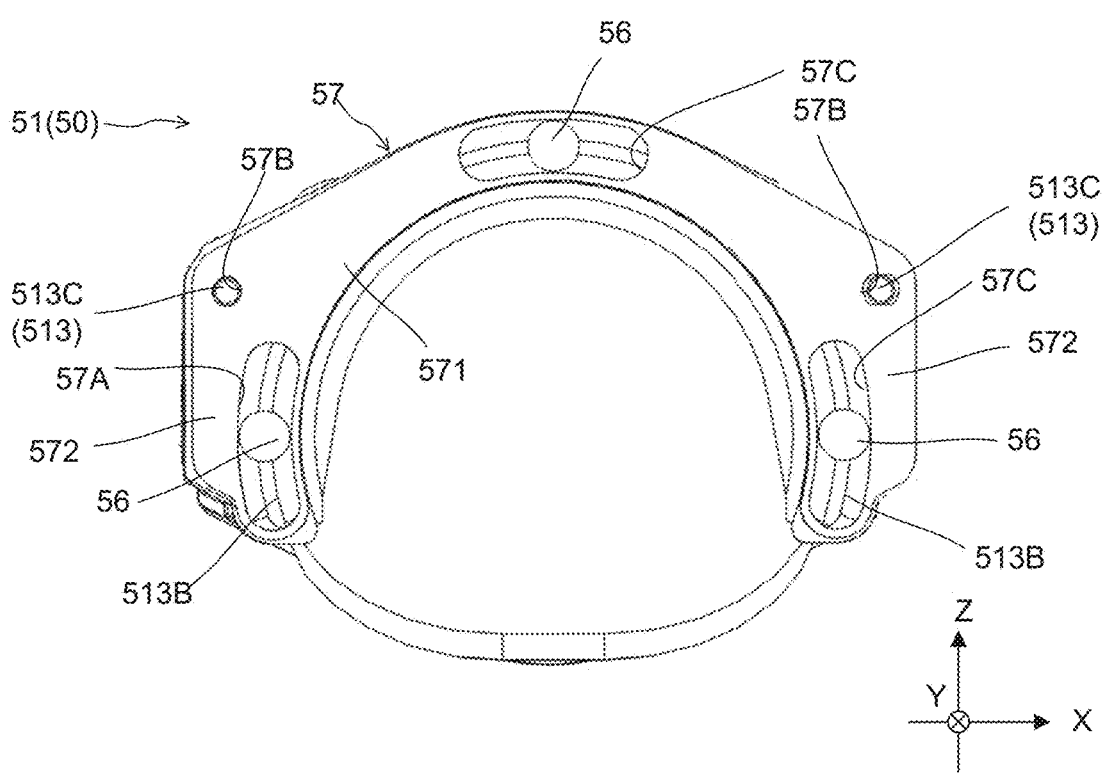
FIG. 38 illustrates a second interval holding part and second sliding parts according to a variation.

For example, as illustrated in FIG. 38, hole 57C provided in second interval holding part 57 (arc part 571) is formed in, for example, a size in which approximately three second sliding parts 56 fit.

Further, in the embodiment described above, three holes 57A in which second sliding parts 56 are disposed are provided in second interval holding part 57, but the present invention is not limited thereto, and three or more holes 57A may be provided.

Figure 39:
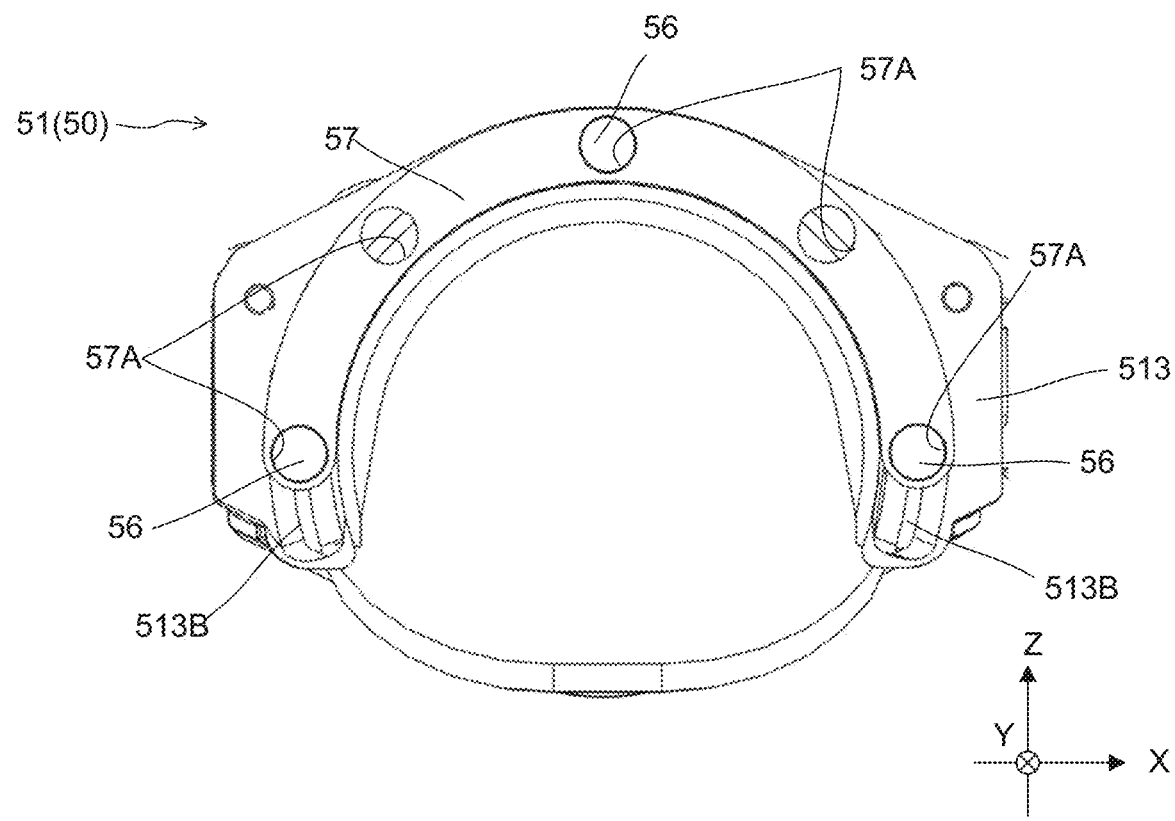
FIG. 39 illustrates a second interval holding part and second sliding parts according to a variation.

For example, as illustrated in FIG. 39, second interval holding part 57 is provided with five holes 57A. With respect to holes 57A, each interval between two holes 57A adjacent to each other in the direction of the rotation is an equal interval.

Such a configuration makes it possible to appropriately adjust holes 57A into which second sliding parts 56 are inserted, and further makes it possible to dispose three or more second sliding parts 56 (for example, five second sliding parts 56 in accordance with holes 57A).

Further, in the embodiment described above, the first interval holding part and the second interval holding part are configured to include holes, but the present invention is not limited thereto. The first interval holding part and the second interval holding part may be configured to include notches in which the sliding parts can be disposed.

Further, in the embodiment described above, each groove part has a shape which tapers toward the bottom thereof, but the present invention is not limited thereto. Each groove part may not have the aforementioned shape.

Further, in the embodiment described above, although each sliding part is configured to be in a spherical shape, the present invention is not limited thereto. Each sliding part may have any shape as long as each sliding part is capable of sliding between the movable part and a portion which the movable part faces.

Further, in the embodiment described above, yoke part 515 is disposed on a side of mirror housing part 50 and magnet part 623 is disposed on a side of mirror holding part 60, but the present invention is not limited thereto. For example, the magnet part may be disposed on the type of the mirror housing part and the yoke part may be disposed on the side of the mirror holding part.

Further, in the embodiment described above, the shapes of the surfaces of yoke part 515 and magnet part 623, where the surfaces face each other, are matched to the shape of the guide surface in mirror guide part 511, but the present invention is not limited thereto. For example, the shapes of the surfaces of yoke part 515 and magnet part 623, where the surfaces face each other, may be any shapes unless the shapes inhibit the guiding of the mirror holding part in the mirror guide part.

Further, in the embodiment described above, the magnet part that generates pressurization for causing the mirror housing part and the mirror holding part to attract each other also serves as the magnet for position detection, but the present invention is not limited thereto, and a magnet part for position detection may be provided separately.

Further, in the embodiment described above, the third sliding parts are interposed between the mirror guide part and the mirror holding part, but the present invention is not limited thereto. The third sliding parts may not be interposed therebetween as long as the mirror guide part is capable of guiding the mirror holding part.

Further, in the embodiment described above, the mirror guide part and the mirror holding part magnetically attract each other, but the present invention is not limited thereto. For example, pressurization for causing the mirror guide part and the mirror holding part to attract each other may be generated by using, for example, an urging member or the like.

Further, in the embodiment described above, mirror holding part 60 is disposed in a state of having no fixed point in housing casing 51, but the present invention is not limited thereto. Mirror holding part 60 may have a fixed point in housing casing 51.

Further, in the embodiment described above, power supply path part 70 extends over the both end parts of mirror housing part 50 in the Y direction, but the present invention is not limited thereto. Power supply path part 70 may not extend over the both end parts as long as power supply path part 70 extends in the Y direction.

Further, in the embodiment described above, three power supply path parts 70 are provided on the side of the positive electrode and three power supply path parts 70 are provided on the side of the negative electrode, but the present invention is not limited thereto. The number of power supply path parts 70 may be changed as appropriate depending on the number of components to which power is supplied.

Further, in the embodiment described above, position fixing part 74 holds only power supply path part 70 in the middle in a free state, but the present invention is not limited thereto. Position fixing part 74 may fix only power supply path part 70 in the middle.

Further, in the embodiment described above, power supply path part 70 extends in a direction along the Y direction, but the present invention is not limited thereto. Power supply path part 70 may not extend in the direction along the Y direction as long as the mirror housing part is configured to rotate around the rotation axis along the Y direction and the power supply path part is configured to include the coil spring (displacement part).

Further, in the embodiment described above, the driving control part, the lens driving control part, and the imaging control part are provided separately, but the present invention is not limited thereto. At least two of the driving control part, the lens driving control part, and the imaging control part may be configured by one control part.

Further, for example, although a smartphone that is a camera-equipped mobile terminal has been described as an example of the camera-mounted apparatus including camera module 1 in the embodiment described above, the present invention is applicable to a camera-mounted apparatus that includes: a camera module; and an image-processing part that processes image information obtained by the camera module. The camera-mounted apparatus encompasses information devices and transport devices. The information devices include, for example, camera-equipped mobile phones, notebook computers, tablet terminals, handheld game consoles, webcams, and camera-equipped in-vehicle apparatuses (for example, rear-view monitor apparatuses and dashboard camera apparatuses). Further, the transport devices include, for example, automobiles and drones.

Figure 40A:
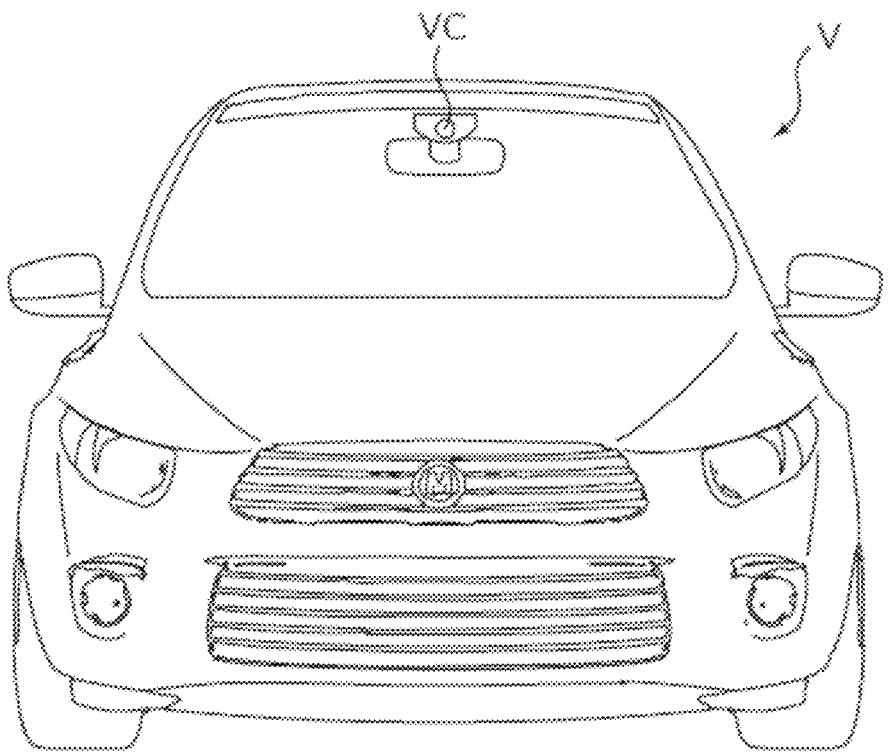
FIG. 40A illustrates an automobile in which a camera module is mounted.
Figure 40B:
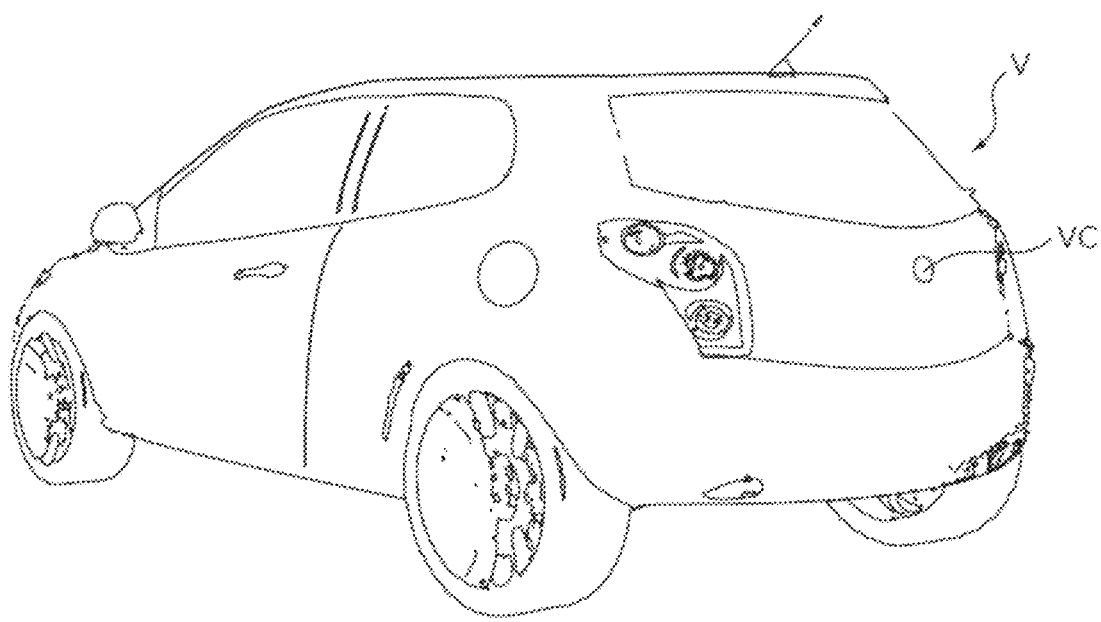
FIG. 40B illustrates the automobile in which the camera module is mounted.

FIGS. 40A and 40B illustrate automobile V as a camera-mounted apparatus in which in-vehicle camera module vehicle camera (VC) is mounted. FIG. 40A is a front view of automobile V, and FIG. 40B is a rear perspective view of automobile V. In automobile V, camera module 1 described in the embodiment is mounted as in-vehicle camera module VC. As illustrated in FIGS. 40A and 40B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, and the like.

In addition, any of the embodiment described above is only illustration of an exemplary embodiment for implementing the present invention, and the technical scope of the present invention shall not be construed limitedly thereby. That is, the present invention can be implemented in various forms without departing from the gist or the main features thereof. For example, the shapes, sizes, numbers, and materials of the respective parts described in the above embodiment are merely exemplary, and can be changed as appropriate for implementing the present invention.

The disclosure of Japanese Patent Application No. 2020-214984, filed on Dec. 24, 2020, including the specification, drawings and abstract, is incorporated herein by reference in its entirety.

INDUSTRIAL APPLICABILITY

An optical element driving apparatus according to the present invention is useful as an optical element driving apparatus, a camera module, and a camera-mounted apparatus each capable of absorbing a deviation of the positional relationship between a movable part and a board part due to movement of the movable part.

REFERENCE SIGNS LIST

1 Camera module
10 Casing
11 Incidence wall
11A Opening
12 Outgoing wall
12A Opening
12B Arc-shaped guide groove part
12C Terminal
13 Side wall
13A Engaged part
13B Recessed part
14 Bottom wall
20 Board part
21 Input/output terminal
21A Input/output terminal
22 Resonance part
23 Position detection part
30 Cover part
31 Main body wall part
31A Protrusion part
32 Resin part
32A Projection part
32B Engaging part
33 Urging part
331 Annular part
332 Arm part
333 Connection part
40 Cap part
41 Annular guide groove part
50 Mirror housing part
50A Contact part
50B Magnet part
51 Housing casing
511 Mirror guide part
511A Rotation guide groove part
511B Resonance part
511C Terminal
512 First sliding wall
512A First sliding groove part
512B Path holding part
513 Second sliding wall
513A Opening
513B Second sliding groove part
514 Side wall
514A Regulation part
514B Yoke disposing part
514C Position detection hole
515 Yoke part
515A First surface
52 Regulation cover part
521 First regulation part
521A First regulation wall
522 Second regulation part
522A Second regulation wall
53 Housing-side board part
531 Main body board part
531A First power supply terminal
531B Second power supply terminal
532 Extending board part
532A Position detection part
54 First sliding part
55 First interval holding part
55A Hole
56 Second sliding part
57 Second interval holding part
57A Hole
60 Mirror holding part
61 Mirror element part
62 Holding casing
621 Main body part
621A Fixing surface
621B Third sliding groove part
622 Magnet holding part
623 Magnet part
623A First pole
623B Second pole
623C Second surface
63 Third sliding part
64 Holding contact part
70 Power supply path part
71A First wire part
71B Second wire part
71C Third wire part
72A First spring part
72B Second spring part
73 Damper member
74 Position fixing part
74A Portion
75 Damper member
100 Driving control part
110 Lens driving part
111 First fixed lens
112 First movable lens
113 Second movable lens
114 Second fixed lens
115 Lens driving control part
120 Imaging part
200 Imaging control part

The invention claimed is:

1. An optical element driving apparatus, comprising:
a movable part capable of holding an optical element, the optical element bending incident light along a first direction such that the incident light travels toward one direction in a second direction;
a driving part that drives the movable part;
a board part capable of supplying power to the movable part; and a power supply path part that forms a power supply path between the board part and the movable part by extending so as to connect a terminal on a side of the board part and a terminal on a side of the movable part and includes a coil part in at least a portion, the terminal on the side of the board part and the terminal on the side of the movable part being disposed away from each other in the second direction, the coil part being extendable and contractible in accordance with movement of the movable part, wherein each of the plurality of power supply path parts includes a wire part at a position different from the positions of the plurality of coil parts.

2. The optical element driving apparatus according to claim 1, wherein the movable part moves such that the terminal on the side of the movable part approaches or separates from the board part.

3. The optical element driving apparatus according to claim 2, wherein:

a plurality of the power supply path parts is provided side by side in a movement direction of the movable part, and a plurality of the coil parts of two power supply path parts of the plurality of power supply path parts are disposed so as to have different positions in the second direction, the two power supply path parts being adjacent to each other in the movement direction.

4. The optical element driving apparatus according to claim 3, wherein:

the plurality of power supply path parts includes a maintenance part that holds respective portions of a plurality of the wire parts of the plurality of power supply path parts and maintains a positional relationship between the plurality of power supply path parts within a certain range.

5. The optical element driving apparatus according to claim 2, wherein a plurality of the power supply path parts is provided on sides of both ends of the movable part in a third direction orthogonal to each of a movement direction of the terminal on the side of the movable part and the second direction.

6. The optical element driving apparatus according to claim 1, wherein the power supply path part extends over both end parts of the movable part in the second direction.

7. The optical element driving apparatus according to claim 1, wherein the driving part rotationally drives the movable part around a rotation axis along the second direction.

8. The optical element driving apparatus according to claim 1, wherein the coil part is a coil spring.

9. An optical element driving apparatus, comprising: a movable part capable of holding an optical element, the optical element bending incident light along a first direction such that the incident light travels toward one direction in a second direction; a driving part that rotationally drives the movable part around a rotation axis along the second direction; a board part capable of supplying power to the movable part; and a power supply path part that includes at least a displacement part and forms a power supply path between the board part and the movable part, the displacement part being extendable and contractible in accordance with movement of the movable part, each of the plurality of power supply path parts includes a wire part at a position different from the positions of the plurality of coil parts.

10. The optical element driving apparatus according to claim 1, wherein:

the movable part houses an optical element holding part that holds the optical element, and the driving part includes:

a first driving part that rotationally drives the movable part around a first rotation axis; and a second driving part that rotationally drives the optical element holding part around a second rotation axis orthogonal to the first rotation axis.

11. A camera module, comprising;

the optical element driving apparatus according to claim 1;

an optical element part including the optical element held by the movable part; and an imaging part that images a subject image formed by the optical element part.

12. A camera-mounted apparatus that is an information device or a transport device, the camera-mounted apparatus comprising:

the camera module according to claim 11; and an imaging control part that processes image information obtained by the camera module.

* * * * *